Jan. 24, 1967  KARL-HANS GUENTHER ENGERT  3,300,716
APPARATUS FOR MEASURING AND TESTING ELECTRICAL PROPERTIES
OF NONCONDUCTIVE MATERIALS
Filed April 18, 1963  8 Sheets-Sheet 8
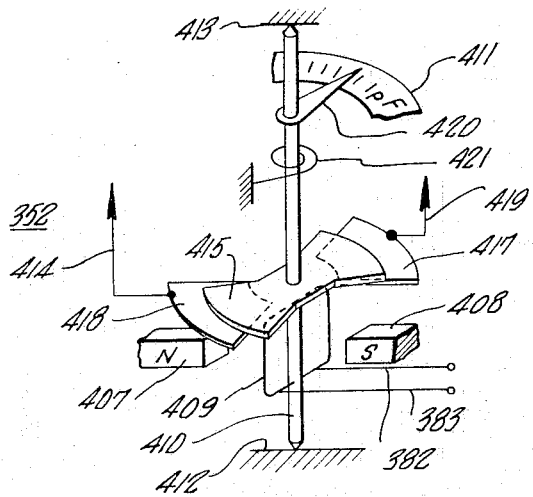
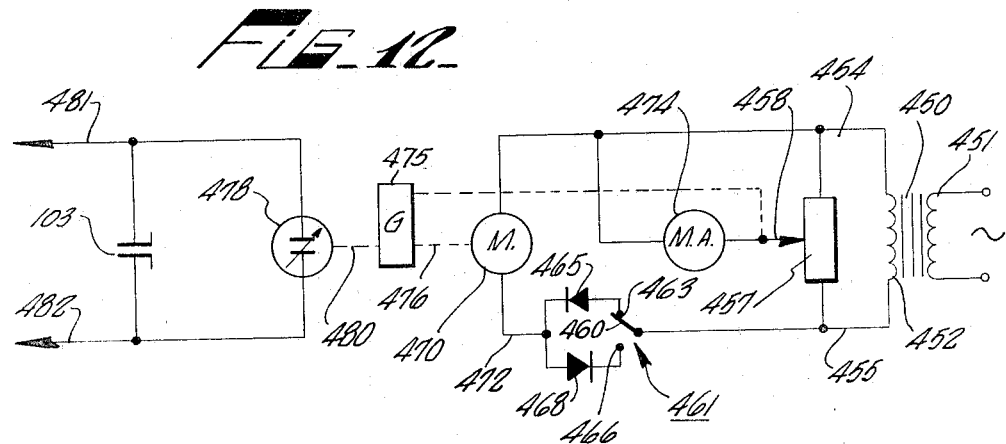
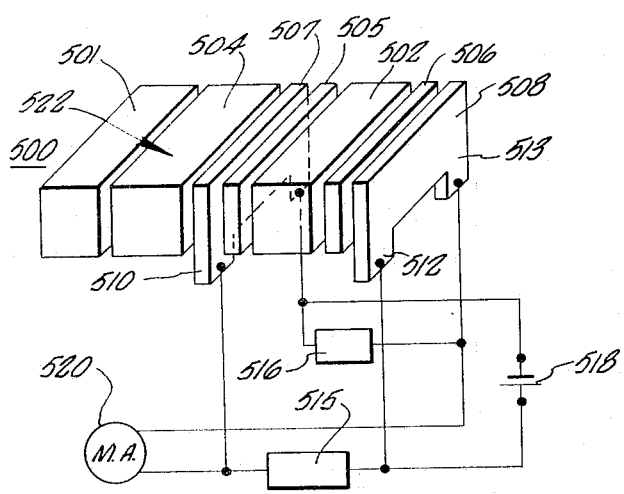
INVENTOR.
KARL-HANS GUENTHER ENGERT
BY
Christie, Parker & Hale
ATTORNEYS.

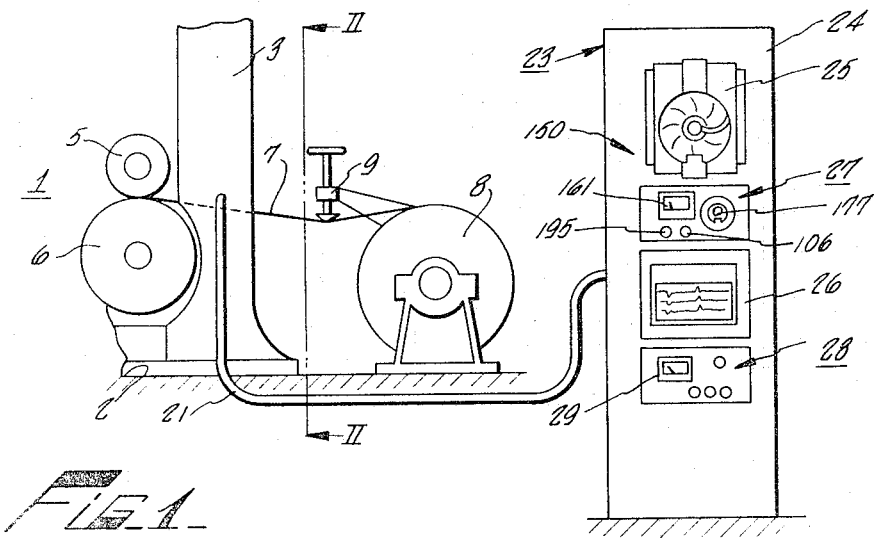
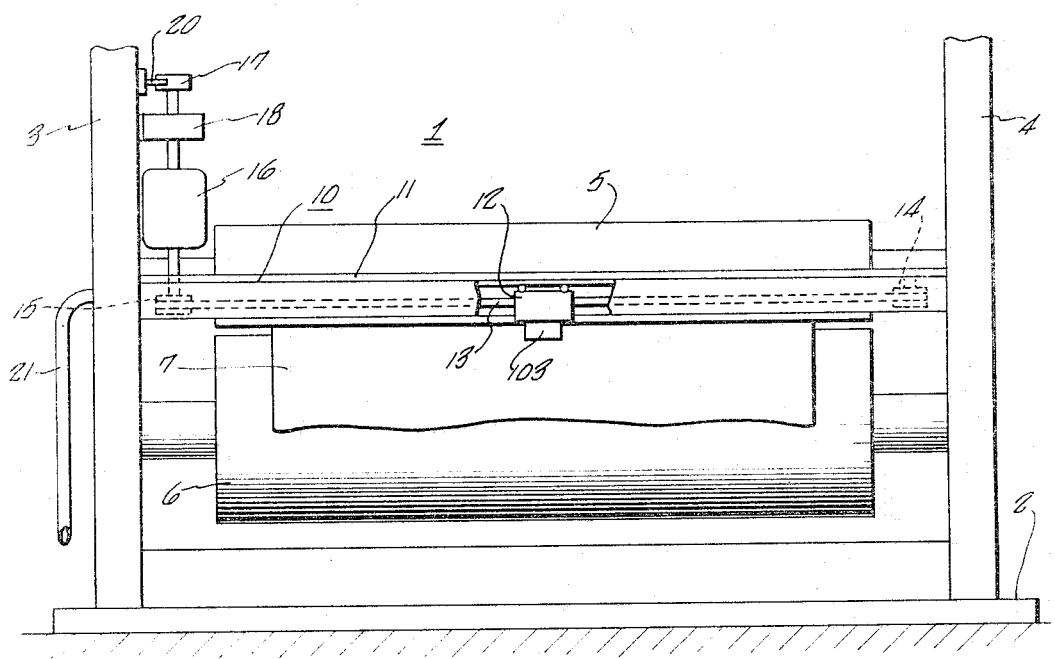

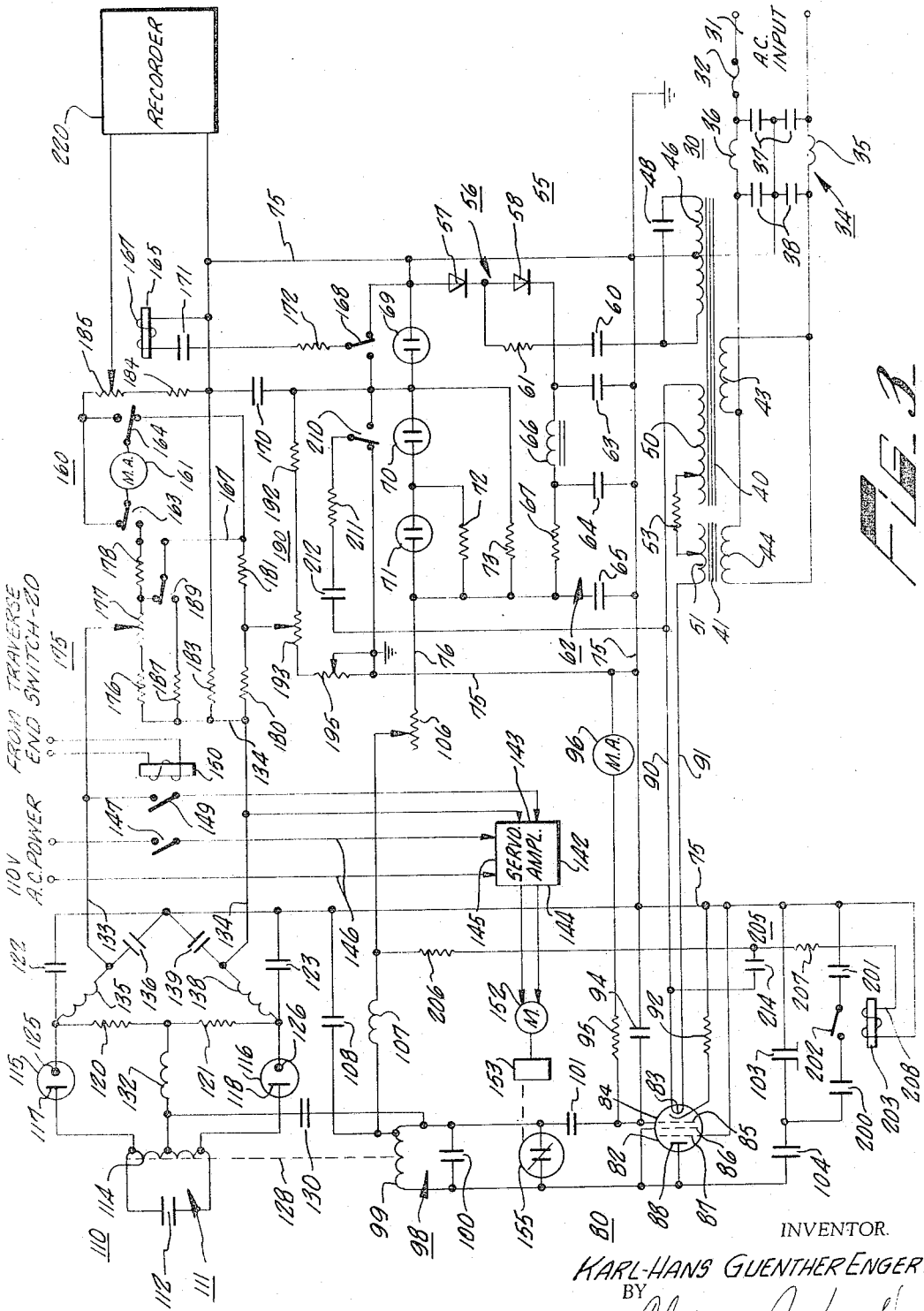

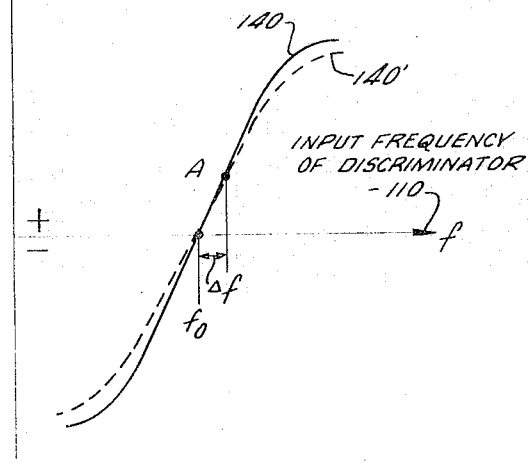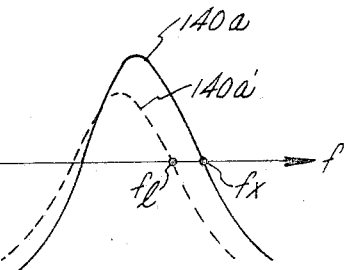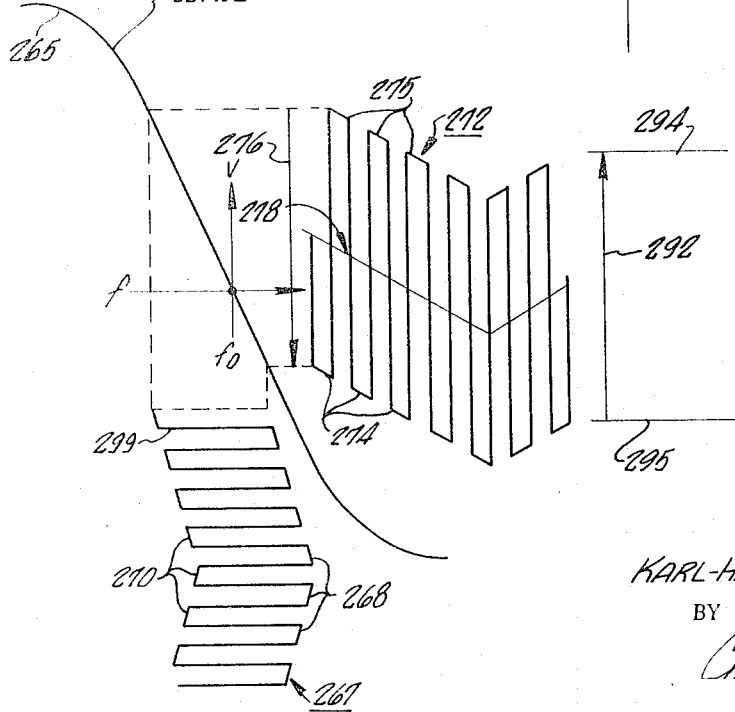

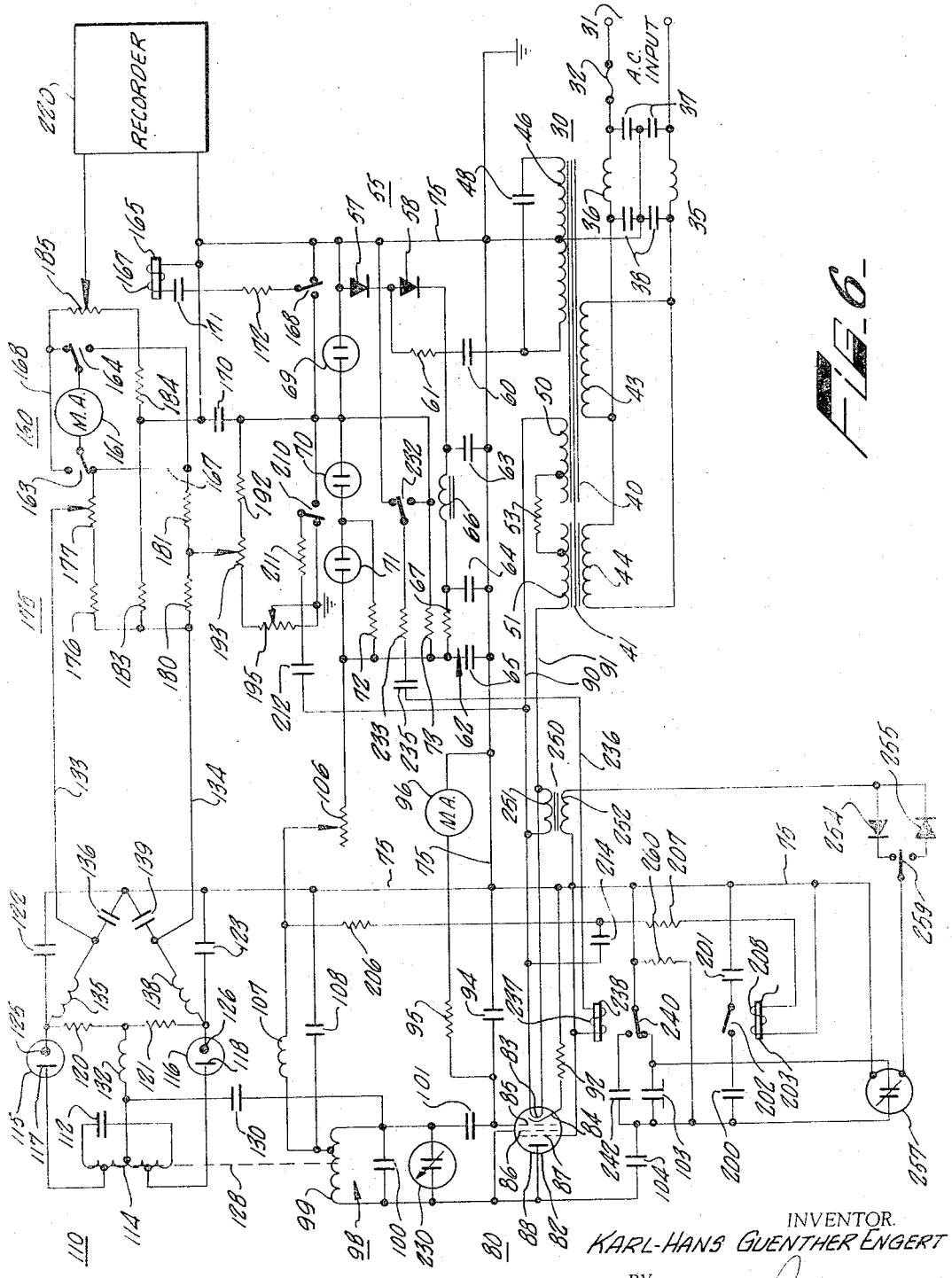

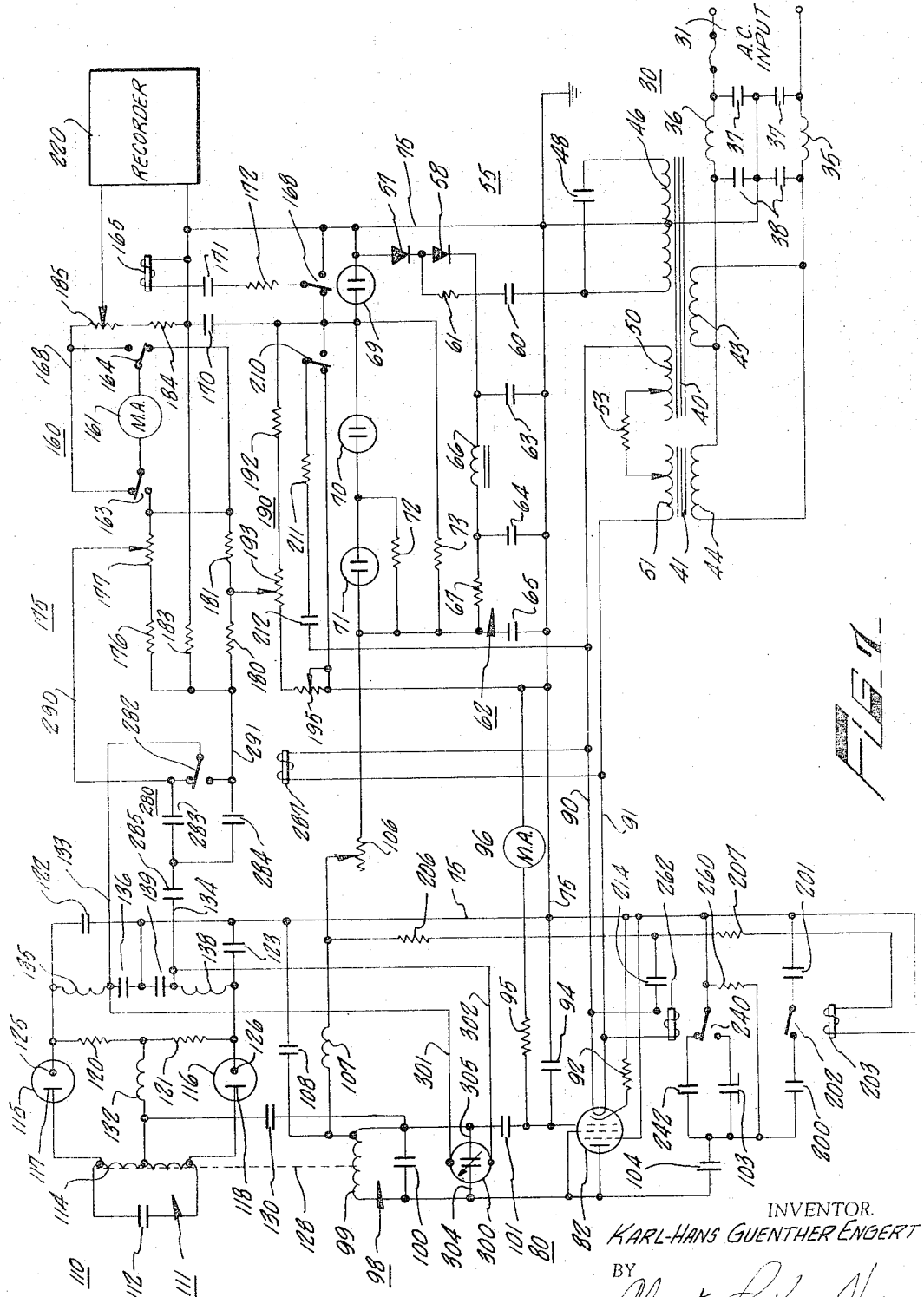

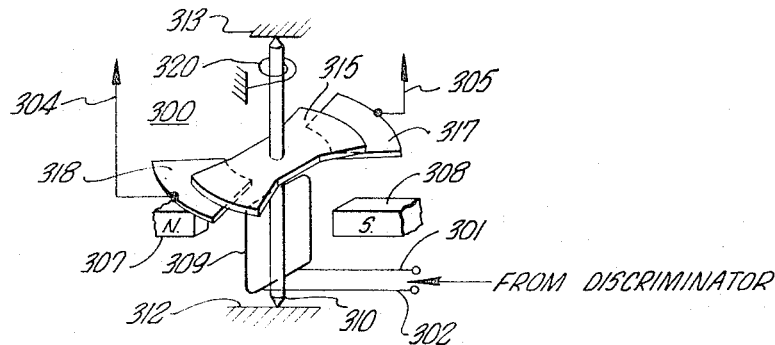
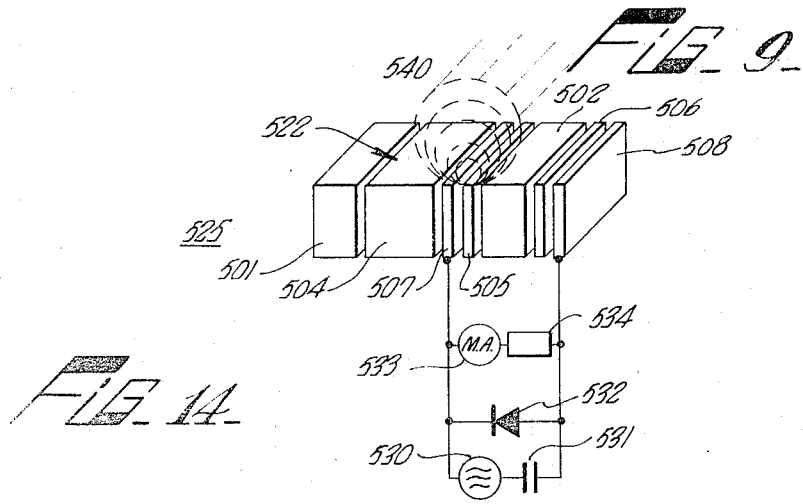
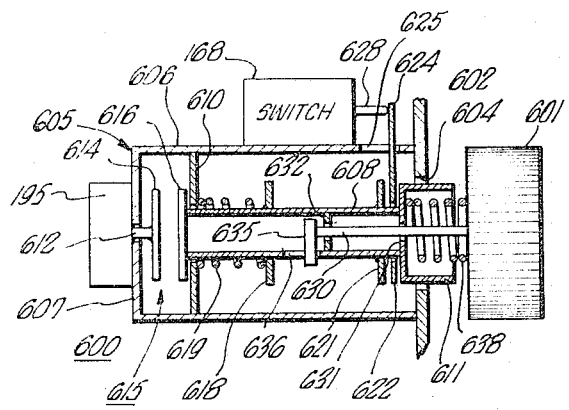

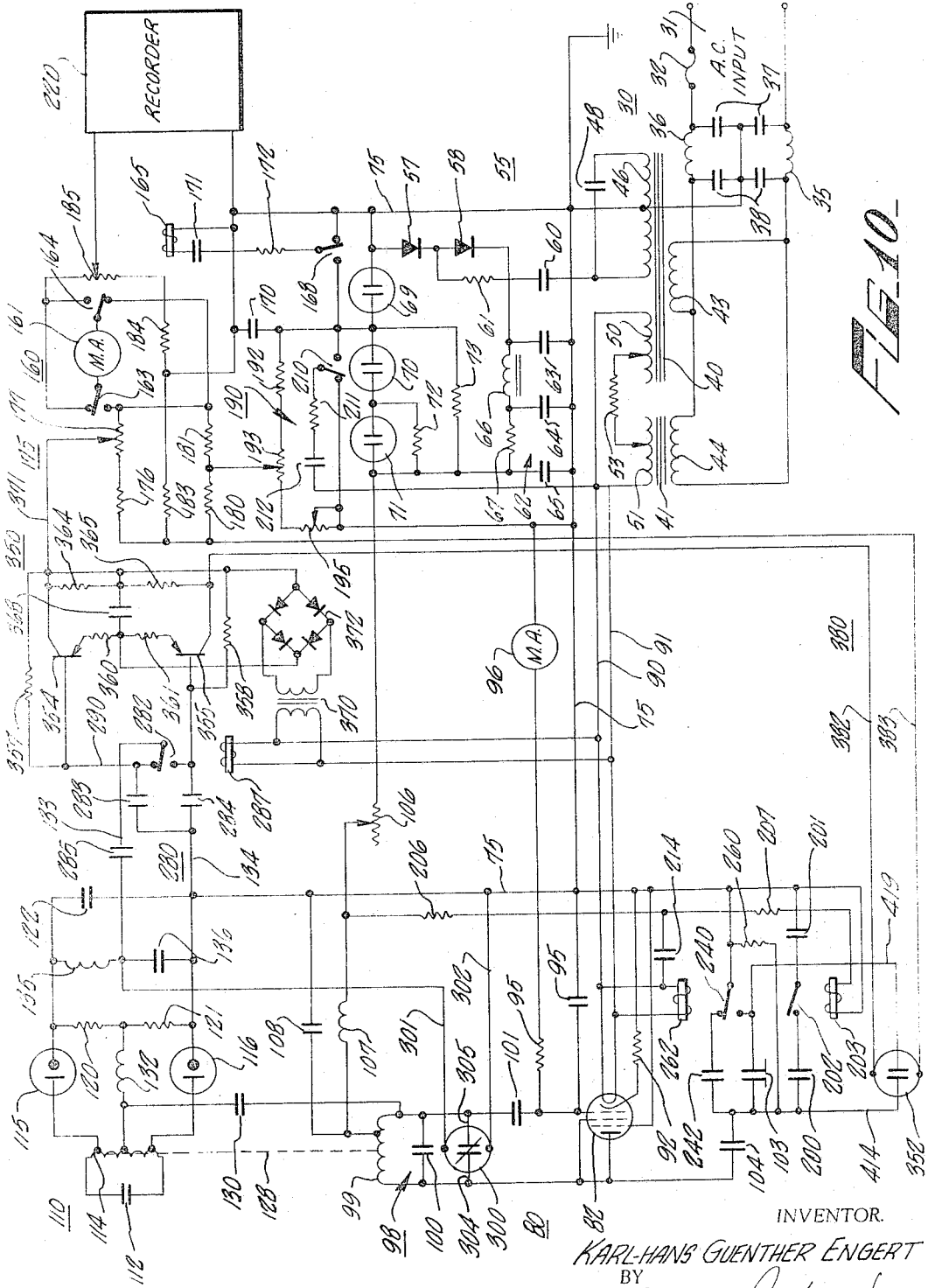

United States Patent Office 3,300,716
Patented Jan. 24, 1967

3,300,716
APPARATUS FOR MEASURING AND TESTING ELECTRICAL PROPERTIES OF NONCONDUCTIVE MATERIALS
Karl-Hans Guenther Engert, Monrovia, Calif., assignor to Consolidated Electrodynamics Corporation, Pasadena, Calif., a corporation of California
Filed Apr. 18, 1963, Ser. No. 273,975
Claims priority, application Canada, Apr. 21, 1962, 847,322
9 Claims. (Cl. 324—61)

The present invention relates to measuring apparatus and systems and, more particularly, to apparatus and systems for testing materials.

It has been known for a long time that certain qualities or parameters, such as moisture content, thickness, compositions, weight, degree of purity, and the like, of certain materials manifest themselves through electrical or electrically measurable qualities. These phenomena have extensively been made use of for the purpose of measuring qualities and parameters of various electroconductive as well as non or low electroconductive materials. To this end, a large number of systems which include apparatus that measure the resistance of materials, capacitor structures that sense the dielectric properties of non or low electroconductive materials, or inductive structures that sense magnetic or inductive properties of electroconductive substances have been devised. For the purpose of convenience, the terms "non-conductive" or "low-conductive" are herein used interchangeably to designate materials that are susceptible to being tested by means of sensing capacitors.

These prior art systems usually contained means for producing an electrical signal that corresponded to the parameter sensed and that could be measured by electrical instruments. One general type of prior-art system employed for this purpose a series of conventional circuits which produced an electric oscillation the frequency of which was a function of the sensed parameter of the material under test, and a conveniently measurable direct-current signal the amplitude of which was a function of the frequency of the aforesaid electric oscillations. In this manner, various materials could be tested in a continuous fashion. However, the measuring accuracy and sensitivity were frequently affected by various drift phenomena occurring in these systems because of aging of the circuit components, undesirable deviation in circuit performance from linear circuit characteristics, and aging and wear of the sensing devices, to name a few examples. Due to these drift phenomena, which could not be eliminated but at best controlled by means of a multitude of adjustments and extraneous equipment, the output signals of the prior-art apparatus became inaccurate and distorted.

The subject invention overcomes these disadvantages and provides various means, apparatus and devices which promote the accuracy, sensitivity and ease of operation of measuring systems of the subject type to a very significant extent.

It will also be appreciated that this object is accomplished by any of the inventive concepts, means and apparatus described herein, and is also realized to an increased extent by cooperation of two or more of these concepts, means and apparatus.

For the purpose of increased clarity and ease of understanding, the invention is primarily described herein in terms of apparatus and systems that work in accordance with capacitive principles. However, it should be understood that those concepts and apparatus of the invention that are not directed to sensing capacitors per se, may also be used in connection with inductive, resistive or other known measuring systems.

From one aspect thereof, the invention provides a measuring system for testing materials, which comprises first means for sensing a predetermined parameter of a material under test and for producing an alternating-current signal the fequency of which corresponds to the sensed parameter, second means for converting the alternating-current signal into a direct-current signal the amplitude of which is a function of the frequency of the alternating-current signal, and means for measuring the amplitude of the direct-current signal. According to one feature of the invention, the second means just referred to include a phase-shift discriminator which is of a type having a substantially S-shaped discriminator characteristic. Discriminators of this type are known in the art of frequency modulation radio transmission. I have discovered that this type of discriminator imparts very significant features to measuring systems for testing materials. In this connection, it should be understood that a material when tested, even if it be of the desired quality, will introduce certain losses into the measuring system. For example, a sheet of paper that is of the desired quality will still give rise to losses that are primarily due to the normal acid and alkali components as present in various types of papers. Ordinarily, these losses cause a reduction in the peak voltage of the above-mentioned alternating-current signal. In known measuring systems of the subject type, the detecting means employed for converting this alternating-current signal into the above-mentioned direct-current signal operate at a point near the peak of the resonance curve of the particular detecting circuit, so that any shift in the aforesaid peak voltage or performance of the detecting circuit would shift the reference point of the detecting circuit, so that there already are unavoidable error signals at the initiation of the measurements. The discriminator just described will minimize these errors, since its S-shaped characteristic will not deviate from the point at which it intersects the frequency axis of the discriminator characteristic diagram, but will merely tilt somewhat from its initial position when losses occur. In this manner, measurements will be taken from a substantially fixed reference point that is not materially affected by the normal losses encountered with most materials to be tested.

In a preferred embodiment of the inventions, the above-mentioned means for converting changes in dielectric properties of the material under test into an alternating-current signal comprise a sensing capacitor exposed to the material under test and an oscillator having the sensing capacitor connected to its input and producing at its output an alternating current signal, the frequency of which is a function of the capacity changes occurring at the sensing capacitor while being exposed to the material under test. To this effect, the oscillator has at least one oscillator tube, transistor, tunnel diode or other suitable negative resistance device, and an output coil or tank circuit determining the resonant frequency of the oscillator. This tank circuit or output coil is coupled with the input circuit of the discriminator and is initially tuned to the inherent resonant frequency of this discriminator.

As the measurements proceed, the oscillator usually will become subject to the above-mentioned drifts, so that its resonant frequency will start to deviate from the inherent discriminator frequency. In this manner, the output signals of the discriminator will no longer give an accurate indication of the instant dielectric properties of the material under test.

The subject invention, from another aspect thereof, overcomes this disadvantage by providing apparatus which automatically, and preferably periodically, adapt the oscillator frequency to that of the discriminator. These apparatus comprise a variable capacitor arrangement associated with the oscillator tank circuit, and a servo loop for adjusting the variable capacitor in response to the output signal of the discriminator. Preferably, this adjustment is effected when the sensing capacitor is not exposed to material. Initially, the oscillator and the discriminator are adjusted so that there is no output signal at the discriminator when the sensing capacitor is not exposed to material. As the oscillator starts to drift, a spurious output signal will appear at the discriminator output. This spurious output signal is utilized to energize the latter servo loop, which will accordingly adjust the variable capacitor associated with the oscillator tank circuit. In this manner, the oscillator tank circuit may be automatically tuned to have a resonant frequency corresponding to the existing inherent frequency of the discriminator.

In a particularly advantageous embodiment of this aspect of the invention, the sensing capacitor is periodically removed from the material under test, so that the latter adjustment can be periodically effected. If the measuring system is used to test moving sheets of material, such as paper, the sensing capacitor is preferably moved back and forth across the sheet so that it will leave the sheet after each transverse movement. A switch is then provided which will connect the input of the servo loop to the output of the discriminator, each time the sensing capacitor is off the sheet. In this manner, adjustments for drift are automatically and periodically effected.

From another aspect thereof, the invention provides a measuring system being of the above-mentioned type and including a measuring instrument responsive to the above-mentioned direct-current signal, e.g. the output signal of the discriminator. According to this aspect of the invention, the measuring circuit includes a bridge circuit for permitting application of a bias current to the instrument but preventing flow of this bias current back to the discriminator. In this manner, the measuring instrument may be electrically biased to extend its measuring range, to cause it to show quality deviations in the material under test directly or to cause it to operate accurately in the presence of minor spurious signals. A full description of these features is provided below.

The invention also provides means for periodically checking the performance of the measuring system. These means comprise a capacitor arrangement having a known capacity, and a pulse-operated relay circuit for connecting the latter capacitor arrangement to the sensing capacitor. Since the combination of this capacitor arrangement of known capacity with the sensing capacitor should result in a specific deviation of the discriminator output signal from its initial value, actuation of the means just mentioned will provide a convenient indication as to whether the system operates properly. Thus, if the indication obtained differs from that expected, the user of the system is informed that adjustments in the measuring system, such as adjustment of the oscillator plate voltage, are necessary.

The invention, from another aspect thereof, also provides means for measuring capacity deviations at the sensing capacitor with a particularly high degree of accuracy. These latter means include a circuit for continually comparing the instant capacity of the sensing capacitor with the fixed capacity of a comparison capacitor. These means also include a circuit for producing a signal corresponding to the difference between the discriminator output signal produced in response to the instant capacitance of the sensing capacitor and the discriminator output signal produced in response to the capacitance of the comparison capacitor. In this manner, quality deviations in the material under test may be measured accurately, irrespective of drift in the oscillator or discriminator, since both of the discriminator output signals just mentioned are equally affected by such drift, so that their difference is practically drift free.

The invention, from yet another aspect thereof, provides means for automatically maintaining the operation of the discriminator within the linear range of its characteristic. These latter means comprise a circuit arrangement, more fully described below, for adapting the frequency of the output signals of the oscillator to the linear range of the discriminator response characteristic.

From still another aspect thereof, the invention provides means for amplifying the above-mentioned direct-current signal or the aforesaid difference signal, prior to measurement thereof, and for suppressing spurious signals by means of apparatus operating in the manner of a negative feedback loop and being effective between the output of the amplifying means and the terminals of the sensing capacitor. In this manner, even smallest quality deviations in various materials can be measured with high accuracy. A full description of a preferred embodiment of these latter means is provided below.

From a further aspect thereof, the invention provides ways and means for determining the degree of wear of the sensing capacitor, or for compensating the effect of sensing-capacitor wear. These features are very important if highly abrasive materials, such as asbestos, sand or the like, are to be tested.

In addition, the invention provides a device for adjusting the above-mentioned bias current which flows through the measuring instrument and effecting a compensation of spurious signals with a single knob.

Various other features and aspects of the invention will become apparent as the description proceeds.

The invention and its various aspects will become more readily apparent from the following detailed description of preferred embodiments thereof, illustrated by way of example in the accompanying drawings, in which:

FIG. 1 is a diagrammatic illustration of a paper making machine and an instrument panel incorporating apparatus used in the practice of the invention;

FIG. 2 is a view along line II—II of FIG. 1;

FIG. 3 is a circuit diagram of a measuring system according to a preferred embodiment of the invention;

FIG. 4 shows a discriminator characteristic essential to the understanding of the operation of the measuring system shown in FIG. 3;

FIG. 5 shows, by comparison to FIG. 4, a response characteristic of detector circuits used in prior-art measuring systems;

FIG. 6 is a circuit diagram of a measuring system according to a further preferred embodiment of the invention;

FIG. 7 is a circuit diagram of a measuring system according to yet another preferred embodiment of the invention;

FIG. 8 shows a series of amplitude-versus-frequency diagrams helpful to the understanding of the operation of the system shown in FIG. 7;

FIG. 9 shows details of a device employed in the measuring system of FIG. 7;

FIG. 10 shows a modification of the measuring system illustrated in FIG. 7;

FIG. 11 shows details of a device employed in the measuring system of FIG. 10;

FIG. 12 shows a diagram of an apparatus for indicating the degree of wear of a sensing capacitor and for compensating for the effects of such wear;

FIG. 13 illustrates other means for measuring the degree of wear of a sensing capacitor;

FIG. 14 shows yet another means for indicating the degree of wear of a sensing capacitor; and FIG. 15 shows a longitudinal section of a novel apparatus for effecting with a single knob two adjustments in any one of the measuring systems shown in FIGS. 3, 6, 7 or 10.

FIGS. 1 and 2 illustrate part of a paper making machine 1 which comprises a base 2, a pair of uprights 3 and 4 and a pair of horizontally mounted rollers 5 and 6 between which the paper 7 emerges to be wound on a take-up roll 8 after proper tensioning by a conventional tension device 9. It will be recognized that the parts and machine so far described are conventional. According to FIG. 2, a traversing assembly 10 is mounted between uprights 3 and 4. This traverse assembly may also be of a conventional type and thus includes an inverted U-beam 11, and a carriage 12 mounted for reciprocal movement in beam 11. Carriage 12 carries a sensing capacitor 103 and is driven by means of an endless cable 13 which is attached to carriage 12 and extends over a pair of sheaves indicated in dotted lines at 14 and 15. The reciprocal movement of the endless cable 13 is effected by a motor 16 which is mounted upright 3 and drives sheave 15. Motor 16 also drives a cam 17 through a reduction gear 18. Cam 17 periodically actuates a sensing contact 20 which is associated therewith. The configuration of cam 17 is such that it actuates contact 20 every time the carriage 12 moves closest to upright 4. In this position, the sensing capacitor 103 is removed from the paper 7, so that the above-mentioned frequency adjustments can be effected. These adjustments are initiated by the contact 20, which will hereinafter be termed "traverse end switch 20," since it operates when the carriage 12 reaches the one outer limit of its continuous reciprocal travel across paper sheet 7. If desired, a limit switch periodically actuated by carriage 12 and located adjacent upright 4 may be provided instead of parts 17 and 20. The reciprocal movement of motor 16 may be effected by one of the well-known control apparatus available for this purpose. The function of the traverse end switch 20 will be more fully discussed in connection with the system shown in FIG. 3. Traverse end switch 20 and sensing capacitor 103 are connected to a cable 21. To this end, contact rails or other suitable means (not shown) may be provided in beam 11. The parts so far described are well known in the art and are merely illustrated to facilitate the understanding of the invention.

In general, it should be understood that the invention is by no means limited to use of the type of traversing assembly just described. There are a great variety of sensing capacitors and sensing heads known in the art, each particularly suitable for some specific purpose. The measuring systems herein described may, of course, be provided with any of these sensing capacitors or heads and will be thus capable of testing a great variety of materials, such as paper or other non-conductive foil, asbestos, woodchips, sand or other granular, non or low conductive material, or a great variety of other non or low conductive substances. Also, the measuring systems herein described will function whether the problem is to effect dielectric measurements on a stationary substance or on a material that moves relative to the sensing capacitor or head. In the former case, the above-mentioned change in capacity is the change encountered when an initially unexposed sensing capacitor is exposed to the material under test, and in the latter case the aforesaid changes in capacity are the changes encountered when the material under test moves past a sensing capacitor.

In practice, the circuits and instruments which process and indicate the sensing capacitor changes or variations are usually located a considerable distance from the machinery or structure at which the sensing capacitor is disposed. For instance, in a paper making plant, the circuitry and instruments are sometimes located at a distance of some 200 to 500 feet from the paper machines. The same holds true for other plants in which the subject measuring systems may find application. This fact is illustrated in FIG. 1 by showing the unit 23 which comprises the circuitry and instruments of the measuring systems of the subject invention as being distinct and relatively remote from the sensing area and being connected with the above-mentioned parts associated with machine 1 by the cable 21.

The unit 23 has an instrument panel 24 on which there is located a first recorder 25, a second recorder 26, a first sub-panel 27 and a second sub-panel 28. The first and second recorders may be connected to the circuitry of the measuring system in the manner shown for recorder 220 in FIGS. 3, 6, 7 or 10. The first recorder 25 is preferably a long-term recorder which has a slowly moving recording medium and thus records the average quality of the material over a long period of time, such as a 24 hour period. Recorders of this type are well known in the art. The second recorder 26 is a short-term recorder that provides an individual trace for each traversing movement of the sensing capacitor 103 shown in FIG. 2. To this effect, the movement of the recording pen or device is synchronized with the movement of the carriage 12 shown in FIG. 2. This type of recorder and the means for effecting such synchronous movement are also well known in the art and readily available on the market.

The sub-panel 27 carries the instrument or meter 161 hereinafter to be described in connection with FIGS. 3, 6, 7 and 10. The potentiometer 177 of the network 175, and the potentiometers 106 and 195 are also shown and described in connection with these latter figures. The other potentiometers and the manually actuable ones of the switches shown in these figures may, of course, also be located on the instrument panel.

The sub-panel 28 has an instrument 29 the pointer of which is synchronized with the movement of the carriage 12 shown in FIG. 2. This type of instrument and the means for synchronizing its pointer movement are also well known in the art. The instrument serves primarily as a means for checking the performances of short-term recorder 26 and also the performance of the traversing assembly 10 shown in FIG. 2.

It will, of course, be understood that the type of arrangement of instruments illustrated in FIG. 1 has been shown only by way of example and that merely the instruments shown in FIGS. 3, 6, 7 and 10 need be used. FIG. 3 shows one form of measuring circuit according to the invention. This circuit is particularly suitable for measuring dielectric properties and corresponding physical parameters, such as quality, moisture, thickness, composition or weight, of moving sheets of an electrically insulating material, such as textile, paper or other non or low-conducting foil.

The circuit shown in FIG. 3 comprises a power supply 30 which has an input 31, a protective fuse 32, a filter network 34 composed of chokes 35 and 36 and grounded capacitors 37 and 38 and two transformers 40 and 41 which have their primary windings 43 and 44 connected through filter network 34 to power input 31. Transformer 40 is a conventional constant-voltage transformer and may be of the so-called "Sola-transformer" type. It has a main secondary winding 46 with a grounded center tap and a capacitor 48 connected across its outer terminals. Capacitor 48 is so dimensioned with respect to winding 46, that this winding and capacitor form a circuit which oscillates at line frequency. Transformer 40 also has an additional secondary winding 50 and transformer 41 a secondary winding 51. These two secondary windings 50 and 51 jointly serve to provide a highly stabilized voltage of relatively low magnitude. To this effect, they are interconnected by a resistor 53. This interconnection is effected in such a manner that the voltage of secondary winding 51 will buck the voltage of secondary winding 50. In addition, the voltage of secondary winding 51 is maintained smaller than that of secondary winding 50, so that the percentage deviation of the unregulated voltage at winding 51 will approximately compensate for the percentage variation of the regulated voltage at winding 50.

The means and techniques described so far with respect to FIG. 3 are well known per se in the art.

The voltage across one half of the tuned main secondary winding 46 is applied to a rectifier and voltage stabilizer circuit 55 of power supply 30. This circuit 55 comprises a conventional voltage doubler arrangement 56 composed of rectifiers 57 and 58, voltage retention capacitor 60 and associated resistor 61. The rectified voltage is filtered by a network 62 composed of capacitors 63, 64, and 65, choke 66 and resistor 67, and stabilized by gas tubes 69, 70 and 71 with associated firing resistors 72 and 73. This arrangement is also conventional and well known in the art.

The stabilized and filtered direct-current voltage is applied to ground lead 75 and plate voltage lead 76.

The circuit of FIG. 3 further includes an oscillator 80 which may be of the Hartley oscillator type, as shown. Oscillator 80 comprises a pentode 82 having a filament 83, an indirectly heated cathode 84, a control grid 85, a screen grid 86, a suppressor grid 87 and a plate 88. Filament 83 is connected to secondary winding 50 and 51 through leads 90 and 91, and cathode 84 to ground lead 75 through a conventional cathode resistor 92. Screen grid 86 is interconnected with plate 88 and suppressor grid 87 with ground lead 75. A conventional grid capacitor 94 is connected between grid 85 and ground lead 75. A grid leak resistor 95 is connected to grid 85 and to ground lead 75 through a milliammeter 96 which serves to indicate the grid leak current.

A tank circuit 98 composed primarily of inductance coil 99 and capacitor 100 is connected between plate 88 and grid 85 through a direct-current isolating capacitor 101. The measuring capacitor 103 of the circuit together with a series capacitor 104 is connected between ground lead 75 and plate 88.

Plate voltage for plate 88 is supplied through lead 76, voltage adjustment potentiometer 106, high-frequency isolating choke coil 107 and part of inductance coil 99, as shown. A capacitor 108 by-passes the plate voltage supply circuit.

Considering the parts of oscillator circuit 80 so far described, it will be recognized by those skilled in the art that capacity variations in capacitor 103 will cause corresponding frequency variations in tank circuit 98. The capacity variations in capacitor 103 depend, of course, primarily on the variations in dielectric properties of the material to which capacitor 103 is exposed.

The output signal of tank circuit 98 is applied to a phase-shift discriminator 110 which comprises primarily a tuned circuit 111 composed of capacitor 112 and center-tapped inductive coil 114, a pair of rectifying diodes 115 and 116 having their plates 117 and 118 connected to coil 114, and a pair of output resistors 120 and 121, with associated charging capacitors 122 and 123, connected to cathodes 125 and 126 of diodes 115 and 116, as shown. Coil 114 is inductively coupled to tank coil 99 as indicated by dotted line 128, and one side of tank coil 99 is connected to the center tap of discriminator coil 114 through a capacitor 130 which prevents the direct-current plate voltage in circuit 80 from entering the discriminator circuit 110 and, in conjunction with a choke 132, provides a 90° phase shift of the signal conveyed from oscillator 80 to discriminator 110. In this manner, the output signal of tank circuit 98 enters the discriminator circuit 110. The junction between resistors 120 and 121 is connected through a choke 132 to the center tap of coil 114 so as to provide a return path for the direct-current component of the rectified current flowing through diodes 115 and 116. The direct-current signal to be discussed below across the series connected resistors 120 and 121 is picked up by leads 133 and 134. Lead 133 is connected to the outer end of resistor 120 through a radio-frequency choke 135 which, together with ground-connected capacitor 136 filters out undesirable high-frequency components. Lead 134 is connected to the outer end of resistor 121 through a radio-frequency choke 138 which also filters out undesirable high-frequency components in cooperation with ground-connected capacitor 139.

The oscillator circuit 80 and discriminator circuit 110 and their operation are per se well known in the art. The function of these circuits in the subject sensing and testing apparatus will now be outlined.

The sensing capacitor 103 and oscillator circuit 80 are dimensioned such that the tank circuit 98 will operate at resonant frequency as long as the capacitor 103 is not exposed to a material or, in other words, is "empty." For the sake of convenience, this resonant frequency will be referred to herein as "nominal frequency" and designated by the reference $f_0$. The discriminator 110 is of a type that will produce equal and opposing signals across its resistors 120 and 121 as long as the signal applied to discriminator 110 has a frequency corresponding to the resonant frequency of tank circuit 98 or, in other words, has the above-mentioned "nominal frequency." In this case, there normally will be no output signal between leads 133 and 134. For the sake of brevity, discriminators that operate in this manner, may be referred to as "zero discriminators."

As the sensing capacitor 103 is exposed to material to be tested, its capacity will be changed in accordance with the dielectric properties of the material. With the type of oscillator circuit 80 employed, these capacity variations will reflect themselves in deviations from the nominal frequency of the signal in tank circuit 98.

With the type of discriminator 110 employed, these frequency variations will unbalance the individual voltages across resistors 120 and 121 so that a resulting output signal occurs between leads 133 and 134. The variation of this output signal as a function of the discriminator 110 input frequency is illustrated by curve 140 in FIG. 4. It will be recognized that this curve 140 resembles what is known in the art as "discriminator characteristic." It will also be appreciated that the signal between leads 133 and 134 will, for instance, assume a value A if the input signal of discriminator 110 experiences a deviation $\Delta f$ from the nominal frequency. Under normal conditions, this value A of the signal across leads 133 and 134 will reflect a change in capacity of sensing capacitor 103 proportional to the dielectric properties of the material to which capacitor 103 is exposed. In this manner, it is possible to determine the dielectric properties of the tested material, and thus those qualities of the tested material which are reflected in its dielectric properties, by measuring the output signal between leads 133 and 134.

In practice, dielectric losses in the material to be tested to which capacitor 103 is exposed will cause a slight alteration in the discriminator characteristics, such as from the curve 140 to the curve 140' indicated in FIG. 1 in dotted lines, unless an amplitude stabilizer stage is employed. However, with the type of discriminator used herein, this variation due to losses will only slightly affect the value of the output signal as is apparent from FIG. 4. This is particularly true in view of the fact that the loss-affected curve 140' will still intersect the frequency axis at point $f_0$. In this connection, reference should also be had to previously mentioned capacitor 104 which is in series with sensing capacitor 103. This capacitor 104 is of high quality while the sensing capacitor 103 is subjected to the losses of the material under test. Since capacitors 103 and 104 are in series, the losses in capacitor 103 as seen by the input of oscillator circuit 80 are not as fully effective on oscillator 80 and thus on discriminator 110 as they would be in the absence of capacitor 104. In addition, capacitor 104 also isolates capacitor 103 from the oscillator plate voltage.

These are very significant features of the subject invention, which will be apparent from a consideration of FIG. 5 that schematically shows, for the purpose of comparison, a detector characteristic obtained from the type of frequency detectors employed in prior art dielectric-property measuring circuits. It will be recognized from FIG. 5 that curve 140a shown therein represents the noloss characteristic of a so-called slope detector. The significant half of curve 140a intersects the frequency axis at point $f_x$. However, if losses occur in these prior circuits, the curve 140a will be modified to curve 140a' and the point of intersection will shift from point $f_x$ to a point $f_1$. Therefore, the output signal occurring at the detector output will no longer be substantially a function of frequency variation $\Delta f$, but rather a combination of the above-mentioned losses and $\Delta f$. This distortion is avoided by employing, according to the subject invention, the type of discriminator generally referred to herein as "zero discriminator."

Another error occurring in practice is caused by the tendency of certain components of electronic circuitry to experience slight changes in their characteristic. This tendency is generally referred to in the art as "drifting." In the instant case, the frequency response characteristics of discriminator 110, for instance, may drift so that the curve 140 shown in FIG. 4 does no longer intersect the frequency axis $f$ at point $f_0$. In principle, this undesirable condition, which manifests itself by the presence of a spurious output signal between leads 133 and 134 at point $f_0$, could be corrected by adjusting the frequency-response determining elements of discriminator 110. According to the subject invention, however, this adjustment is effected in the oscillator circuit 80.

To this effect, the circuit in FIG. 3 includes a servo amplifier 142 which may be of a conventional type that serves to amplify, upon energization of power input 145, an input signal occurring at input 143 to an output signal at output 144. Power input 145 is energized through leads 146 and switch 147 from a suitable source of electric power (not shown), such as a conventional 110-volt outlet. The signal input 143 is connected to leads 133 and 134 through a contact 149 of a relay 150. The output 144 is connected to a servo motor 152 which is mechanically coupled to a reducing gear 153 which, in turn, is mechanically coupled to a variable capacitor 155 connected across capacitor 100 of tank circuit 98. Gear 153 may be a self-locking type worm gear and serves to reduce the rate of rotation of motor 152 to a rate of rotation suitable for driving variable capacitor 155. This capacitor 155 may be of a conventional variable type and serves, in effect, as a trimmer of tank capacitor 100.

The operation of this servo loop is as follows:

The sensing capacitor 103 is periodically removed from the material to be tested. In this "empty" state of capacitor 103, the signal between leads 133 and 134 should be zero, as has been explained above. However, as has also been explained above, there will be a spurious signal between leads 133 and 134 if the resonant frequency of discriminator 110, for instance, has drifted. This spurious signal is applied to servo amplifier input 143 by energizing relay 150 and thus closing contact 149 while the capacitor 103 is removed from the material to be tested. In principle, relay 150 could be energized from an electric source (not shown) in any suitable manual or automatic manner. If the system is employed in connection with the paper making machine shown in FIGS. 1 and 2, it will be most advantageous to energize relay 150 through traverse end switch 20, since the sensing capacitor 103 is off the paper to be tested while the end switch 20 is being actuated.

At any rate, the servo amplifier 142 will amplify the spurious signal between leads 133 and 134 to a corresponding output signal which will occur at amplifier output 144, and will have a positive or a negative polarity depending on the polarity of the spurious signal applied to amplifier input 143. This output signal is applied to motor 152 which is of a type that will rotate in one or the other sense of rotation, depending on the polarity of the signal applied thereto. In this manner, motor 152, through gear 153, will either increase or decrease the capacity of variable capacitor 155, and thus decrease or increase the resonant frequency of tank circuit 98.

It will now be recognized that the servo loop just described will automatically adapt the output frequency of oscillator 80 to the actual frequency-response characteristic of discriminator 110. Expressed in broader terms, this servo loop will help to maintain a stable reference point for the material-quality measurements effected by the circuit of FIG. 3.

Before the sensing capacitor 103 is again exposed to the material to be tested, the relay 150 will be de-energized and the servo loop including amplifier 142 thus deactivated. The variable capacitor 155 will thus stay, for the time being, in the position to which it was last adjusted in response to a spurious signal between leads 133 and 134.

The material to which capacitor 103 is now exposed will, of course, have a dielectric constant which is different from the value "one." This dielectric constant will have a specific value if the quality of the material is equal to its desired quality. Accordingly, there will be a specific variation in the capacity of capacitor 103, a specific variation in the frequency of oscillator 80, and an output signal between leads 133 and 134 of a corresponding specific amplitude. Variations in the quality of the material under test from the desired quality will cause corresponding variations in the output signal between leads 133 and 134. This output signal is applied to a measuring circuit 160.

Measuring circuit 160 comprises a meter 161, which may be a conventional milliammeter and which has associated therewith two double-throw switches 163 and 164. These switches are jointly operated by a relay 165. The lower stationary contacts, as seen in FIG. 3, of switches 163 and 164 are interconnected with each other by a lead 167, and the upper stationary contacts of switches 163 and 164 are interconnected with each other by a lead. The movable contacts or blades of switches 163 and 164 are connected to meter 161, as shown. It will be appreciated that the direction of flow of current through meter 161 can be reversed and the range of meter 161 thus switched from positive to negative values by jointly actuating switches 163 and 164 from their illustrated one position to their other position. Relay 165 and switches 163 and 164 form a bistable arrangement in which the switches, in the absence of further actuation, will stay in the position to which they have last been actuated. To accomplish this result, relay 165 may be of the polarized type. Coil 167 of relay 165 is energized from an electric current occurring across stabilizer tube 69 and having a voltage of, say, 90 volts. This energization is controlled by a double-throw switch 168 which has one of its stationary contacts connected to ground lead 75 and its other stationary contact to the junction between stabilizer tubes 69 and 70. A circuit extends from the latter junction from ground lead 75 through relay coil 167, capacitor 171 and resistor 172, the movable contact or blade of switch 168 and back to ground lead 75. If the switch 168 is moved from the position shown in FIG. 3 to its other position, a charging current for capacitor 171 will flow through relay coil 167. This will cause relay 165 to actuate its switches 163 and 164 to their other position. If switch 168 is moved back to its illustrated position, a similar but reverse capacitor discharge current will flow through relay coil 167, so that the switches 163 and 164 are returned to their one position. In this manner, the flow of current through meter 161 can be remotely controlled in a convenient way.

The output signal between leads 133 and 134 is applied to meter 161 through a resistor network 175. For the purpose of convenience, this network may be broken down into the following branches:

(a) A current divider branch extending between leads 134 and 167 and including a resistor 176, a potentiometer 177 having lead 133 connected to its movable arm, and a resistor 178;

(b) A further branch extending between leads 134 and 167 and including series-connected resistors 180 and 181;

(c) An additional branch extending between leads 134 and 168 and including series-connected resistors 183 and 184 and potentiometer 185; and (d) A resistor 187 connected at one end to lead 134.

There are, of course, various other ways in which network 175 could be broken down into branches. However, the mode of division just given is believed to be a particularly convenient one. A double-throw switch 189, which is connected to shunt the resistor 178 in one switch position and to connect resistor 187 in parallel to the above-mentioned voltage divider branch in the other switch position, serves to adjust the sensitivity of meter 161 to two different ranges. The purpose of network 175 will be more fully understood after a consideration of a bias current circuit 190 that extends between the junction of stabilizer tubes 69 and 70 and ground lead 75, and includes, in that order, a resistor 192, a coarse-adjustment potentiometer 193, and a fine-adjustment or vernier potentiometer 195. This circuit 190 serves to supply a bias current to meter 161 and is, for this purpose, connected through the movable arm of potentiometer 193 to the junction between resistors 180 and 181, and through common ground lead 75 to the junction between resistors 183 and 184.

With the switch 189 positioned as shown in FIG. 3, the current from the movable arm of potentiometer 193 to ground lead 75 flows primarily through two different branches, namely a first branch including resistor 181, lead 167, switch 164, meter 161, switch 163, lead 168, potentiometer 185, and resistor 184 connected to ground lead 75; and a second branch including resistor 180 and resistor 183 connected to ground lead 75. For the purpose of the present consideration, these two branches may be broken down into a bridge circuit which has four corners and four arms. This will become clearly apparent if one considers, for instance, the point to which movable arm of potentiometer 193 is connected as the first corner, the point in network 175 to which lead 134 is connected as the second corner, the junction between resistors 183 and 184 to which ground lead 75 is connected as the third corner, and the point to which the movable blade of switch 189 is connected as the fourth corner of the present bridge. Resistor 180 will then occupy what may be termed the first bridge arm, resistor 183 the second bridge arm, the series-connected resistors 184 and 185 and meter 161 the third bridge arm, and resistor 181 the fourth bridge arm. In practice, the resistances of the four bridge arms will, in accordance with the well known techniques relating to resistive bridges, be proportioned so that there is no potential difference between the aforesaid second and fourth bridge corners when current is applied to the first and third corners.

In this manner, flow of current in leads 133 and 134 from network 175 back to discriminator 110 is avoided in a convenient and inexpensive manner. The same is, of course, true when switch 89 is actuated from its shown position so as to introduce resistors 178 and 187 into network 175 in order to increase the measuring range of meter 161, since the introduction of these resistors does not add any elements to the above-mentioned arms of the bridge circuit, but merely changes the resistance of the above-mentioned current divider branch comprising now resistors 176, 177, 178; and resistor 187 connected in parallel thereto.

Having thus prevented the backflow of current to discriminator 110, the potentiometers 193 and 195 may be adjusted to achieve, for instance, the following effects:

The bias current through meter 160 may be utilized to suppress any portion of the signal between leads 133 and 134 due to the presence of material of desired quality at the sensing capacitor. For example, in the case of a moisture meter the signal due to the presence of dry material at the sensing capacitor does not contribute anything to the information desired. For instance, if a paper should have a moisture content of, say, 5% and one is merely interested in the amounts of deviation from this 5% value, it would be more convention to have meter 161 indicate, say, +0.17% or −0.17% than 5.17% or 4.83%. True, the 5% moisture content of the paper under test will cause a corresponding signal to appear between leads 133 and 134. However, once this signal enters network 175 it may be compensated by a counter current derived from the bias current 190 and adjusted by the coarse-adjustment potentiometer 193 and subsequently by the fine-adjustment or vernier potentiometer 195. In this manner, a meter 161 that has a centered zero point and a negative range to the left side and a positive range to the right side of its zero point may be operated so that it shows zero when the material under test has the desired qualities, and indicates the absolute amount of deviation from such desired quality, rather than the algebraic sum of desired quality plus or minus quality deviation.

Secondly, meter 161 may be of a type that ordinarily shows only positive values but should be used to indicate negative values over a relatively wide range. In this case, the potentiometers 193 and 195 may be adjusted so that the needle of meter 161 is moved sufficiently to the right to provide the desired negative range. For example, let's assume that the meter 161, at a desired quality of material under test, shows a hypothetical value of 5, but that the person carrying out the test would be interested in quality deviations of up to minus 7 hypothetical units. In this case, the bias current emanating from bias circuit 190 and flowing through meter 161 may be adjusted so that the meter, at desired quality, shows a value of, say, 7. A deviation of minus 7 units would then bring the needle of meter 161 back to zero. In this manner, the above-mentioned maximum negative deviation is still within the meter range.

Thirdly, the aging of the components of the subject circuit, and particularly of the servo amplifier 142, may cause the output signal between leads 133 and 134 to deviate slightly from zero. In principle, it would be possible to correct this error by adjusting or replacing the servo amplifier. However, if this signal deviation is only slight, it might not be practicable to go through the relatively inconvenient steps of adjusting or replacing servo amplifier 142. A more convenient means of effecting this minor adjustment is provided by vernier potentiometer 195. Thus, if the person carrying out the test should notice, by observing meter 161, that there is some spurious drift signal, he can, by adjusting vernier potentiometer 195, introduce such a bias into meter circuit 160 that the slight signal indicated by meter 161 is overcome at such point $f_0$. In this manner, the reference basis for the meter indications is re-established. In addition, if the system does not employ a servo loop of the type shown in FIG. 3 as including servo amplifier 142, the potentiometer 195 may be used to perform, to a certain extent, the function of this servo loop.

To prevent the circuits connected to the junction between stabilizer tubes 69 and 70 from affecting the operation of stabilizer tube 69 and from drawing excessive temporary currents from direct-current supply 55, a larger capacitor 170 is connected between this junction and ground lead 75 so as to store energy for the operation of these circuits.

Occasionally, the user of the apparatus shown in FIG. 3 may want an assurance that the meter indications are still accurate even though the system has been in use for longer periods of time. A convenient way to obtain this assurance resides in the addition of a given capacity to the sensing capacitor 103 while it is not exposed to material to be tested. Thus, an addition of, say, 1 pf. to the capacity of capacitor 103 will give a meter indication corresponding to a capacity deviation of 1 pf., provided the system of FIG. 3 performs as intended. However, should the performance of the system drift, the meter 161 will show a value that does not exactly correspond to 1 pf. of capacity variation. In this case, the user of the system will know that adjustments are necessary, and will be able to make these on the spot by varying potentiometer 106.

The system shown in FIG. 3 includes means for temporarily introducing these given capacity deviations. These means include capacitors 200 and 201 which, by means of contact 202 of a relay 203 may be connected in parallel to sensing capacitor 103 whenever it is desired to check the sensitivity of the system in the manner just described. It will be recognized that capacitors 200 and 201 jointly define the above-mentioned given capacity deviation. In the quiescent state, relay 203 is energized through a circuit 205 extending from the junction between choke 107 and the movable arm of potentiometer 106 and thus from a point of relatively high potential to the ground lead 75. This circuit 205 includes a high-ohmic resistor 206, resistor 207 and coil 208 of relay 203. Due to the presence of high-ohmic resistor 206, the quiescent current through circuit 205 and thus through relay coil 208 will be rather small. The main purpose of this quiescent current is to make relay 203 bistable so as to maintain its contact 202 in the position to which this contact had last been switched.

Relay 203 and contact 202 also form a bistable arrangement in which the contact, in the absence of further actuation, will remain in the position to which it has last been switched. Relay 203 may thus be of the polarized type. The relay coil 208 is energized to cause switching of contact 202 through a circuit which includes a double-throw switch 210 (in the vicinity of stabilizer tube 70), a resistor 211, a capacitor 212, heating current lead 90, a capacitor 214, resistor 207, and relay coil 208. The free end of relay 208 is connected to ground lead 75. One of the stationary contacts of switch 210 is connected to the abovementioned junction between stabilizer tubes 69 and 70, and thus to a point of positive potential which may be, to name an example, 90 volts. The other stationary contact of switch 210 is connected to ground lead 75. If the switch 210 is actuated from its illustrated position to its other position, a charging current for capacitors 212 and 214 will flow from the junction between stabilizer tubes 69 and 70 and, accordingly, also through relay coil 208 by way of the circuit just described. Relay 203 will thus close contact 202. This energizing current will, of course, cease once the capacitors 212 and 214 are charged. However, due to the bistable nature of relay 203, the contact 202 will remain in its closed position pending further energization of relay 203. Return of switch 210 to its illustrated position will cause a discharge current to flow from capacitors 212 and 214 which will energize relay coil 208 to cause switching of contact 202 to its illustrated, open position.

It will now be recognized that relay 203 is actuated by means of very short current pulses, rather than by means of direct currents. The great advantage of this pulse-mode type of operation resides in the fact that the circuitry shown in FIG. 3 is not disturbed by persisting relay switching currents while the test measurements are taken. Thus, the contact 202 will have been actuated before the user of the system will take the above-mentioned sensitivity measurements from meter 161. Similar considerations apply also to the above-mentioned relay 165 and its pulse-mode type of energization circuit including capacitor 171. In this manner, the test conditions are equal to the actual operating conditions of the system, which is very important.

In practice, it will be found that deviations of the meter reading from the value meter 161 ought to show during insertion of a given capacity variation by introduction of capacitors 200 and 201 can largely be corrected by adjustment of potentiometer 106 which controls the plate voltage supplied to oscillator tube 82.

The technique of testing the performance of the system by inserting a capacitor of known capacity into the circuit of the sensing capacitor has very significant advantages over prior art methods which attempted to carry out these tests by subjecting the sensing capacitor to materials of supposedly known properties. Frequently, the testing materials thus used had to be checked and analyzed again and again to make sure that their properties correspond exactly to the values they were supposed to have. The present technique according to the invention also distinguishes itself favorably from prior art methods that utilized external auxiliary electrodes for carrying out sensitivity tests.

If desired, the signals occurring in measuring circuit 160 may be recorded. For this purpose, the system in FIG. 3 includes a recorder 220 which is connected to ground lead 75 and to the movable arm of potentiometer 185.

It will now be appreciated that the system of FIG. 3 incorporates various significant concepts which, for example, reside in the provision of a "zero discriminator," as defined above, for creating a particularly convenient reference point from which measurements may be taken; a servo loop including amplifier 142 for maintaining this reference point despite frequency drift; a bias current circuit 190 for adapting the meter 161 to various measurement conditions, and for permitting also compensation of undesirable drifts from the aforesaid reference point; an arrangement including bridge-type network 175 for preventing backflow of bias currents to discriminator 110 or, for that matter, to servo amplifier 142; a pulse-energized switching arrangement including relay 165 for conveniently changing the direction of current flow through meter 160 in order to read the bias current; and a further pulse-operated arrangement including relay 203 and capacitors 200 and 201 for effecting convenient and accurate sensitivity checks and adjustments.

In the system of FIG. 3, all these circuits and arrangements cooperate to produce the result desired of this system. On the other hand, it should be understood that a major advance in the art could already be achieved if not all of these circuits or arrangements were incorporated in the system shown in FIG. 3.

The system shown in FIG. 6 is similar in circuitry to that shown in FIG. 3 so that like reference numerals are used for like parts. For the purpose of simplification, the high-low range switch 189 and associated resistors 178 and 187 employed in the network 175 of FIG. 3 have not been shown in FIG. 6, but may, of course, be employed if desired. Also, a manually actuable trimmer capacitor 230 shown in oscillator circuit 80 of FIG. 6 has been substituted for the servo controlled variable capacitor 155 and associated servo loop shown in FIG. 3. This latter servo loop may, however, also be used in the system of FIG. 6.

For an elaboration on those of the parts and circuits in FIG. 6 which bear the reference numerals employed in FIG. 3, reference should be had to the preceding detailed description of FIG. 3. Basically, the system illustrated in FIG. 6 includes two circuits not shown in FIG. 3. One of these is a circuit including a double-throw switch 232 (shown below stabilizer tube 70 as seen in FIG. 6), a resistor 233 connected to the movable contact or blade of switch 232, a capacitor 235, a lead 236, and a coil 237 of a relay 238. The free end of relay coil 237 is connected to ground lead 75. One of the stationary contacts of switch 232 is connected to ground lead 75, and the other stationary contact to the junction between stabilizer tubes 69 and 70, at which junction there exists a positive potential of, say, 90 volts, as has been mentioned above. If the blade of switch 232 is moved from its illustrated position to its other position, a charging current will flow to capacitor 212 and thus through relay coil 237. A discharge current will flow through relay coil 237 if the switch 232 is moved back to its illustrated position. In this manner, relay 238 is energized in the pulse-type fashion mentioned above in connection with relays 165 and 203. Relay 238 is of a bistable or polarized type and actuates a double-throw switch 240. Double-throw switch 240, in its illustrated position, connects sensing capacitor 103 to the input of oscillator circuit 80. When actuated to its other position, switch 240 disconnects capacitor 103 from the input of oscillator circuit 80 and introduces a capacitor 242 in the place of capacitor 103. This capacitor 242 corresponds in capacity to the sensing capacitor 103 when not exposed to material or when "empty."

It will now be recognized that the circuit just described constitutes a convenient means for periodically checking the measuring system for bias, drift or sensitivity while the sensing capacity 103 is exposed to material under test. It also constitutes a means for checking the actual capacity of sensing capacitor 103. Thus, if switch 232 is actuated to cause temporary replacement of capacitor 103 by fixed capacitor 242, there will be no change in indication noticeable from meter 161, unless the sensing capacitor 103, such as by wear and tear, has been sufficiently altered to have a capacity different from its initial capacity value.

It will be noted that the system of FIG. 6 contains a resistor 260 connected between ground lead 75 and the junction between capacitors 103, 104 and 242. This resistor will, of course, introduce a certain initial loss in the circuits containing capacitors 103 and 242. This initial loss is desirable where the material under test is of a type having relatively large losses itself, even when it is of the desired quality. In this case, the resistor 260 reduces the difference in loss of the empty sensing capacitor 103 and the losses present when the sensor capacitor is subjected to material. Also in this manner, the change in meter indication as the sensing capacitor is subjected to material having variable losses is kept within reasonable limits. If desired, a resistor similar to resistor 260 may also be used in the system of FIG. 3.

FIG. 6 also contains a circuit, namely the second one of the aforesaid two additional circuits, for compensating to a large extent for undesirable capacity variations in sensing capacitor 103. This compensating circuit includes a transformer 250 having its primary winding 251 connected to the heating-current leads 90 and 91, and one end of its secondary winding 252 to ground lead 75. The other end of secondary winding 252 is connected to the anode of a rectifier cell 254 and to the cathode of a rectifier cell 255. A motor-driven variable capacitor 257 has its capacitive parts connected across sensing capacitor 103 and the input of its motor to ground lead 75, on the one hand, and to the movable blade of a switch 259, on the other hand. Variable capacitor 257 may consist of elements similar to those shown in FIG. 3 in connection with variable capacitor 155, gear 153, and servo motor 152 illustrated in that figure. One stationary contact of switch 259 is connected to the cathode of cell 254, and the other stationary contact of this switch is connected to the anode of cell 255. If the user of the system notices from instrument 161 a change in capacity when switching from sensing capacitor 103 to comparison capacitor 242, he may actuate the blade of switch 259 between its stationary contacts until no more changes in the reading of meter 161 occur during actuation of switch 232. This is possible because the motor in variable capacitor device 257 is of a type which rotates in one direction when energized with current of one polarity (rectifier cell 254) and in the opposite direction when energized with current of the opposite polarity (rectifier cell 255). Motor-driven variable capacitors of this type are conventional per se.

It will now be recognized that the system shown in FIG. 6 incorporates circuitry which not only permits the periodical checking of undesirable deviations in sensing capacitor 103, but also the convenient correction of these variations. This significant feature is particularly important if abrading materials, such as asbestos and the like, which physically affect the sensing capacitor, are tested. However, the circuitry may also be used where factors other than abrasion may bring about a gradual change in the initial characteristics of capacitor 103. The circuitry just described may also be incorporated in the system of FIG. 3.

FIG. 7 shows another system of the subject invention which is particularly adapted to indicate quality deviations of the material under test with high accuracy.

Since the system of FIG. 7 makes use of the basic circuitry of the previously illustrated systems, the components of this circuitry have been designated by the reference numerals employed in the description of these components in connection with FIGS. 3 and 6. Reference should therefore, be had to these latter figures and their description for an understanding of the basic circuitry involved in the system of FIG. 7.

In FIG. 7, the double-throw switch 240 is not manually actuated as it was in FIG. 6, but is vibrated between its stationary contacts by a chopper relay 262 energized from heating current leads 90 and 91. Since leads 90 and 91 carry on alternating current of, say, 60 cycles, the movable blade of switch 240 will vibrate in a rhythm corresponding to this alternating current. In this manner, the sensing capacitor 103 and the comparison capacitor 242 are alternately applied in fast succession to the input of oscillator circuit 80. Since capacitor 242 is equal in capacity to sensing capacitor 103 when "empty," there will be no variation in the oscillator input signal and thus the oscillator output frequency when the sensing capacitor 103 is not exposed to material and, as is presumed for the moment, has not been subjected to influences that would have changed its characteristics.

However, there will be a change in the oscillator input signal and thus the oscillator output frequency if the sensing capacitor 103 is exposed to material to be tested. FIG. 8 serves the purpose of illustrating the effects of such a change. FIG. 8 shows a discriminator response curve 265 which is similar to that illustrated in FIG. 4, but has been inverted for the purpose of improved illustration of the various signals shown in FIG. 8. It will, of course, be understood that the characteristics of one and the same discriminator 110 can either be plotted as shown in FIG. 4 or as illustrated in FIG. 8, depending on whether one wants to consider output lead 133 with reference to output lead 134 or output lead 134 with reference to output lead 133. At any rate, the idealized square wave 267 shown in FIG. 8 below curve 265 indicates the frequency of the signal at the output of oscillator 80 as applied to discriminator 110. For the purpose of illustration, it is assumed that the right-hand peaks 268 of curve 267 represent the frequency of the oscillator when comparison capacitor 242 is connected to its input. The left-hand peaks 270 of curve 267 show the oscillator frequency when the sensing capacitor 103, which is now subjected to material to be tested, is connected to the oscillator input. This alternate connection of capacitors 103 and 242 is effected by chopper relay 262 and its switch 240, as has been indicated above. Ideally, it would be best if the peaks 268 reflecting the value of comparison capacitor 242 were uniformly located at zero point $f_0$. However, in practice, the characteristics of the components of oscillator 80 may drift so that the peaks 268 will deviate from the frequency $f_0$ at which there would be no output signal between leads 133 and 134 of discriminator 110. Such a drift as a function of time has been indicated in FIG. 8 by drafing the peaks 268 along a hypothetical curve. Peaks 270 have also been drafted along a hypothetical curve to show the effects of this drift while capacitor 103 is connected to oscillator 80.

The output signal of discriminator 110, as occurring between leads 133 and 134, is illustrated by square wave 272 to the right-hand side of discriminator curve 262.

This wave 272 has peaks 274 and 275 that correspond, respectively, to the peaks 268 and 270 of wave 267. The peak-to-peak amplitude 276 of output wave 272 corresponds to the difference in capacity between sensing capacitor 103, as subjected to the material under test, and comparison capacitor 242. However, output wave 272 also reflects the effects of the above-mentioned drift, or, in other words, contains a time-varying drift component that may be diagrammatically represented by the curve 278 shown in FIG. 8.

The system of FIG. 7 includes a circuit 280 which converts the signals represented by curve 272 in FIG. 8 to signal suitable for driving meter 161 and recorder 220 or similar indicating or recording instruments. This converter circuit includes a double-throw switch 282 having its movable contact connected to lead 133, a capacitor 283 having its one terminal connected to one of the stationary contacts of switch 282, and a capacitor 284 having its one terminal connected to the other stationary contact of switch 282, as shown. The other terminals of capacitors 283 and 284 are connected through a capacitor 285 to discriminator output lead 134. Capacitor 285 has a relatively large capacity value as compared to capacitors 283 and 284. In principle, this capacitor 285 may be deleted from the circuit. However, in the system of FIG. 7 it is used to assure galvanic separation between capacitors 283 and 284 and the output of discriminator 110. Switch 282 is driven by a chopper relay 287 energized from leads 90 and 91. Chopper relay 287 vibrates the movable contact of switch 282 in a rhythm corresponding to the frequency of the current in leads 90 and 91. This rhythm will correspond to the rhythm of vibration of the movable contact of switch 240, since both relays 262 and 287 are energized with the same frequency. If we assume for the moment that the movable contacts of switches 240 and 282 are both in the position shown in FIG. 7, it will become clear that capacitor 283 will be charged to a voltage level corresponding to the particular peak 274 existing at the time. If we now assume that the movable contacts of switches 240 and 282 are actuated to their other position, it will become apparent that capacitor 284 will now be charged to a voltage level corresponding to the particular peak 275 of curve 272. The capacitors 283 and 284, as seen from the network 175 of measuring circuit 160, are connected in series, and are inter-connected so as to have capacitor plates of equal polarity electrically joined together. Therefore, the output signal of circuit 280 across leads 290 and 291 will correspond to the difference of the level of the particular peak 275 and the particular adjacent peak 274. In this manner, the output signal between leads 290 and 291 will correspond to the instantaneous difference in capacity between sensing capacitor 103, as affected by the dielectric properties of the material under test, and comparison capacitor 242. The absolute value of the difference between peaks 274 and 275, as considered from one pair of peaks to the next, will, of course, not be affected by the presence of drift component 278. Rather, the signal between lead 290 and 291 will be of a value which corresponds to this difference and which is symbolically indicated in FIG. 8 by an arrow 292 extending between a pair of diagrammatically shown direct-current levels 294 and 295. In practice, drift component 278 will, of course, vary much slower than has been shown in FIG. 8 for the purpose of illustration. However, care should be taken that capacitors 283 and 284 are dimensioned sufficiently small to prevent an integration of the drift component which would then affect the signal between leads 290 and 291. This latter signal is supplied to network 175 and thus to meter 161 and recorder 220.

It will now also be recognized that substantial synchronism in operation of chopper relays 262 and 287 is essential to the proper functioning of the system of FIG. 7. Since both of these relays are energized from the same source, realization of this synchronism is greatly facilitated and is then obtainable by suitable adjustment of these relays, particularly if they are of the polarized type and permit adjustment of their magnets. Synchronism is also obtained by substituting for relays 262 and 287 a single chopper device having two sets of mutually isolated contacts corresponding to switches 240 and 282. Alternatively, these relays and associated switches may be replaced by synchronously rotating contact or capacitor arrangement or by electronic switching means.

The system of FIG. 7 also includes a circuit for maintaining the frequencies of the input signals of discriminator 110 substantially within the linear range of the discriminator characteristic. The problem involved here will become apparent from a consideration of FIG. 8. First, it should of course be understood that the drift in square wave 267 shown in FIG. 8 has been indicated on a somewhat enlarged scale for the purpose of better illustration. In reality, the outermost ones of the peaks 268 and the innermost ones of the peaks 270 will not reach quite as far to the right as has been illustrated. The present consideration will, therefore, for the moment be limited to the top square 299 of square wave 267. As this square 299 grows larger, its left-hand peak will enter the non-linear range of discriminator characteristic 265 and the resulting output signal will be distorted. On the other hand, there would be enough space to the right of square 299 to move this particular square to the right and thus back into the linear range of the discriminator characteristic. Transposing this situation into terms of frequency, the following explanation could be given, strictly for the purpose of illustration:

Assume that the linear range of the characteristic of discriminator 110 extends from, say, 4000 cycles per second (c.p.s.) to, say, 6000 c.p.s. Assume further that the signal produced in response to operation of sensing capacitor 103 assumes frequencies of down to 3500 c.p.s., while the frequency of the signal corresponding to the value of comparison capacitor 242 (FIG. 7) stays in the vicinity of, say, 5000 c.p.s. By simultaneously shifting the frequencies of these signals by 750 c.p.s., both signals would be well within the linear range of the discriminator response characteristic, and frequency drifts of ±250 c.p.s. could still be tolerated without signal distortion.

A further advantage of such an automatic frequency control is that the center operating frequency of the oscillator may be adjusted to the algebraic mean of the frequencies indicated by peaks 268 and 270 in FIG. 8, so that substantially the full linear range of the discriminator characteristic is utilized. This allows the use of sensing capacitors, or, generally, of sensors, that have twice the sensitivity of sensors employed in systems lacking this frequency control, and thereby increase the signal-to-noise ratio and accuracy of the system.

The circuit in FIG. 7 for accomplishing this frequency shift comprises a variable capacitor 300 with input leads 301 and 302 connected across capacitors 136 and 139 at the output of discrimination 110, and output leads 304 and 305 connected across capacitor 100 of tank circuit 98. One possible form of variable capacitor 300 is shown in FIG. 9. It comprises a pair of relatively stationary magnets 307 and 308 having a movable coil 309 disposed in the flux path therebetween. Coil 309 is mounted on a shaft 310 rotatably held between bearings 312 and 313. A butterfly-type capacitor plate 315 is also mounted on shaft 310. Relatively stationary capacitor plates 317 and 318 are located adjacent to but spaced from butterfly plate 315, so that a first capacitor element is formed by plate 317 and butterfly 315 and a second capacitor element by plate 318 and butterfly 315. It will, of course, be understood that the capacitor arrangement 300, for the purpose of increased clarity, has been illustrated in a rather simplified manner. Thus, the means for mounting magnets 307 and 308 and bearings 312 and 313, the means for insulatedly mounting stationary plates 317 and 318, and the means for insulating the movable or butterfly plate from shaft 310 have not been shown, inasmuch as the nature of these means will be readily apparent to those skilled in the art. It should also be understood that more plates than the three shown may be necessary to accomplish a higher desired frequency shift by means of capacitor arrangement 300, and that the use of dielectric material, such as mica, between the capacitor plates might become desirable.

The moving coil 309 of variable capacitor arrangement 300 is connected through leads 301 and 302 to the discriminator output leads 133 and 134, or, in other words, is connected across the capacitors 136 and 139 of discriminator 110. From a consideration of square wave 272 in FIG. 8, it will become apparent that the moving coil 309 shown in FIG. 9 will be alternately energized by voltages corresponding to peaks 274 and 275. This alternate energization of moving coil 309 takes place in fast succession. Due to the inherent electrical and mechanical inertia of the moving parts of variable capacitor arrangement 300, the moving coil 309 with shaft 310 and butterfly plate 315 will, under the influence of the magnetic field established by magnets 307 and 309, assume a position that corresponds to the difference between peaks 274 and 275.

If the material under test, due to changes in its dielectric properties, increases the capacity occurring at sensing capacitor 103, the peaks 275 of curve 272 shown in FIG. 8 will move further away from the peaks 274. Therefore, the difference in potential between peaks 274 and 275 will increase. The moving coil 309 is connected to its input leads 301 and 302 in such a manner that this increase in difference signal will cause the coil 309 to move butterfly plate 315 in a counterclockwise direction as seen in FIG. 9, so that the capacity between butterfly plate 315 and stationary plates 317 and 318 is decreased. Since these stationary plates are connected through leads 304 and 305 across capacitor 100 of oscillator tank circuit 98, this decrease in capacity will increase the resonant frequency of oscillator 80. In this manner, the square wave 267 will move to the right as seen in FIG. 8, and the peaks 270 thereof will be maintained within the linear range of discriminator curve 265. If changes in the dielectric properties of the material under test cause the differences between peaks 268 and 270 of square wave 267 to become smaller, which will manifest itself in decreased differences between peaks 274 and 275 of square wave 272, the butterfly plate 315 of variable capacitor arrangement 300 will move in the sense of increasing capacity, thereby causing movement of the square wave 267 back to a position similar to that shown by way of example in FIG. 8.

The capacitor arrangement 300 is provided with a bias spring 320 connected to shaft 310 for maintaining the butterfly plate 315 at a desired initial position with respect to stationary plates 317 and 318 when there is no output signal between the discriminator output leads 133 and 134.

It will now be recognized that variable capacitor arrangement 300 performs the very essential function of avoiding output signal distortions by maintaining the frequencies of the input signals of discriminator 110 within the linear range of the discriminator characteristic.

If desired, the capacitor arrangement 300 can be replaced by other suitable servo means which are capable of producing capacity or capacitance variations in response to signal variations.

FIG. 10 shows a further embodiment with increased measurement sensitivity and accuracy. The basic circuitry of the system shown in FIG. 10 is closely similar in structure and function to that shown in FIG. 7, so that like components in FIGS. 7 and 10 are designated by like reference numerals. For a thorough understanding of these components and the circuits which they make up, reference should be had to those parts of the preceding text of this description which elaborate on these circuits and components.

One difference of the circuitry shown in FIG. 10 from that of FIG. 7 resides in the deletion of the choke 138 and capacitors 123 and 139 from the output circuit of discriminator 110, and the insertion of capacitor 284 in discriminator output lead 133, rather than in lead 134. In this manner, the discriminator output lead 134 is directly connected to ground lead 75. Lead 134 is, therefore, no longer floating, since this may not be required, but is connected to a reference point common to the entire system.

Another, more significant difference resides in the presence of an amplifier circuit 350 and an additional variable capacitor arrangement 352. The amplifier circuit 350 serves to amplify the output signal of signal converter 280 prior to application thereof to network 175 and measuring circuit 160. To this effect, amplifier circuit 350 comprises a first transistor 354 having its base connected to lead 290 and a second transistor 355 having its base connected to lead 291 of signal converter 280. A pair of series-connected bias resistors 357 and 358 is connected between the bases of transistors 354 and 355. A further pair of series-connected bias resistors 360 and 361 is connected between the emitters of transistors 354 and 355. A pair of load resistors 364 and 365 is connected between the collectors of these transistors. A filter and current-storage capacitor 368 is connected between the junction of bias resistors 360 and 361 and the junction of load resistors 364 and 365.

Energy for operating the amplifier 350 is provided by a direct-current current source which comprises a transformer 370 having its primary winding connected to heating current leads 90 and 91 and a full-wave rectifier 372 having its input connected to the secondary winding of transformer 370. The direct-current output of rectifier 372 is connected to charge capacitor 368 and to thus energize the transistors 354 and 355. It will be noted that the type of amplifier circuit 350 shown in the drawings constitutes what may be termed a symmetrical direct-current amplifier. The output signal of amplifier 350 appears between leads 374 and 375 and corresponds to the signal between leads 290 and 291 as modified by the amplifier gain. It should, of course, be understood that amplifiers with several stages or various other types of amplifiers may be used in the place of the illustrated amplifier circuit 350. In any case, the amplifier will have the effect of rendering the measuring circuit 160 and recorder 220 responsive to smallest deviations in quality of the material under test. The amplifier will amplify the small difference of potential between leads 290 and 291 due to the small difference in capacity between reference capacitor 242 and sensing capacitor 103 plus servo capacitor 352. If the amplification is made $n$ times higher, the servo capacitor will drive the sum of sensing plus servo capacitor so much nearer the reference capacity of 242 that the difference between the two is $1/\sqrt{n}$ times the difference experienced if the amplification is $n$ times lower. The high gain amplifier amplifies this difference $n$ times in order to have an output signal $\sqrt{n}$ times larger than a low gain amplifier.

The apparatus of FIG. 10 includes a circuit 380 which compensates for the error signals just mentioned and imparts a high degree of stability and accuracy to this measuring system. Circuit 380 comprises the above-mentioned capacitor 352 and a pair of leads 382 and 383. The capacitor 352 may be of the type shown in FIG. 9. In other words, the capacitor 352 may be of the same type as the capacitor 300 employed in the system of FIGS. 7 and 10. Accordingly, the variable capacitor 352, as shown in detail in FIG. 11, comprises magnets 407 and 408, a moving coil 409, a shaft 410, bearings 412 and 413, a movable butterfly plate 415, and a pair of stationary capacitor plates 417 and 418, which correspond, respectively, to the parts 307, 308, 309, 310, 312, 313, 315, 317 and 318 shown in FIG. 9. For a more detailed description of the parts 408 to 418 just mentioned, reference should be had to the above description of FIG. 9 and its parts 307 to 318. The capacitor 352 as shown in FIG. 11 also includes a pointer 420 mounted on shaft 410 and an associated, relatively stationary scale 411. Pointer 420 and scale 411 may normally be deleted, since they are primarily used in connection with a modification of the system of FIG. 10, to be described below.

Coil 409 is connected to leads 382 and 383, and stationary plates 417 and 418 to a pair of leads 414 and 419 which connect the capacitive portion of capacitor 352 in parallel to sensing capacitor 103. Leads 382 and 383 are connected, respectively, to the output lead 375 of amplifier 350 and to one end of resistor 176 of network 175, so that the output current of amplifier 350 is caused to flow through the moving coil 409 of variable capacitor 352. Initially, the butterfly plate 415 of variable capacitor 352 is positoned so that this capacitor has a predetermined capacity. This is accomplished by means of a bias spring 421 as shown in FIG. 11. The leads 414 and 419 connect this initial capacity in parallel to sensing capacitor 103. Comparison capacitor 242 may then be adjusted or dimensioned so that its capacity corresponds to the total initial capacity of sensing capacitor 103 and variable capacitor 352. If sensing capacitor 103 is thereafter exposed to a material to be tested, the capacity of the circuit including this sensing capacitor and variable capacitor 352 will be augmented in accordance with the dielectric properties of the material under test. This increase in capacity will ultimately lead to a signal of a certain corresponding magnitude at the output of amplifier 350, and thus to a corresponding current in moving coil 409 of variable capacitor 352. In this connection, it should be noted that the butterfly plate 415 of variable capacitor 352 could, of course, be adjusted, such as by adjustment of bias spring 421, so that the capacity in the circuit comprising sensing capacitor 103 and variable capacitor 352 will match the capacity in comparison capacitor 242 when the material under test has the desired quality. In this case, there would only be an output signal at amplifier 350 when the quality of the material under test deviates from the desired quality thereof.

No matter whether this latter possibility is made use of or not, there will be a deviation in the magnitude of the output signal at amplifier 350 in response to a deviation in quality of the material under test from its desired quality. The magnetic field and the moving coil 409 of variable capacitor 352 are poled and dimensioned so that the current through moving coil 409 which flows in response to the deviating output signal at amplifier will tend to adjust the butterfly plate 415 so that the resulting change in capacity of variable capacitor 352 will nearly compensate for the change in capacity introduced in sensing capacitor 103 by the quality deviation of the material under test. The following numerical example is intended to illustrate this function of variable capacitor 352. The values given are, of course, strictly by way of example and for the purpose of illustration:

Assume that the material under test introduces a capacity deviation of, say, 1 pf. in sensing capacitor 103. Assume that this deviation results in an input signal at amplifier 350 of a magnitude of 2 arbitrary units. Assume that the gain of amplifier 350 is 50, so that the amplified signal at the output of amplifier 350 will then have a magnitude of 100 arbitrary units. Assume further that this output signal of 100 arbitrary units will cause a current of, say 10 arbitrary current units to flow through the moving coil 409 of variable capacitor 352. Assume now that the magnetic and electrical parts of variable capacitor 352 are poled and dimensioned such that the variable capacitor, in response to this current, will tend to decrease its capacity so as to closely but not fully compensate for the above-mentioned 1 pf. introduced by the material under test. At this point it should be noted that the above-mentioned input and output signals at amplifier 350, and thus the corresponding current through moving coil 409 will, of course, decrease as the capacity of variable capacitor 352 approaches the point of compensation for the above-mentioned 1 pf. However, a point will ultimately be reached at which the variable capacitor will compensate for all but, say, 0.1 pf. of the above-mentioned 1 pf. of the material under test. If this ultimate point is reached, the input signal at amplifier 350 will have a magnitude of 0.2 of the above-mentioned arbitrary units (0.1 pf. as compared to 1 pf.) and the output signal at amplifier 350 a magnitude of 10 arbitrary units. The current flowing through moving coil 409 of variable capacitor 352 will then, accordingly, have a magnitude of 1 arbitrary current unit. It will now be recognized that the subject close but not full compensation of the capacity deviation caused by the material under test can, in the instant case of 1 pf. of deviation, be realized by dimensioning the variable capacitor 352 and its parts so that a decrease in capacity from the initial capacity of variable capacitor 352 will result when a current of 1 arbitrary current unit flows through its moving coil 409. As long as capacitor 352 is dimensioned to operate linearly, the capacity variations realized by capacitor 352 will be proportional to the current variations in moving coil 409. In other words, a capacity deviation of, say, 10 pf. at sensing capacitor 103 will cause the sensing capacitor 352 to compensate all but 1 pf. of this 10 pf. deviation, etc.

It will now be recognized that the circuit 380 including variable capacitor 352 operates practically in the same manner as the negative feedback loops extensively employed in amplifier and other electronic circuits. The nature and operation of these negative feedback loops are very well known. They operate on the principle of subtracting from the input signal of an electronic circuit, such as an amplifier, a feedback signal that is proportional to the output signal of the particular electronic circuit. This feedback signal has a certain relation to the particular input signal so that the input signal is diminished by a certain amount. This signal reduction is made up for by the gain of the electronic circuit.

In the instant case, the variable capacitor 352 performs this negative feedback function with respect to the sensing capacitor 103. Considering the well-known fact that negative feedback systems impart a highly improved performance to the circuits in connection with which they are employed, it will become apparent that the negative feedback circuit 380 shown in FIG. 10 will greatly improve the performance of the circuits including oscillator 80, discriminator 110, and amplifier 350. In this manner, performance deviations in these circuits will only play an insignificant part in the measuring results indicated by meter 161 or recorded by recorder 220.

The utility of the pointer 420 with associated scale 411 shown in FIG. 11 will now be described. It has already been indicated that the variable capacitor 352 will tend to compensate the capacity variations introduced by the material under test in sensing capacitor 103. It has also been indicated that this current is proportional to the amount of capacity deviation introduced in sensnig capacitor 103 by the material under test. Since the rotation of shaft 410 is proportional to this current through moving coil 409, it follows that the pointer 420, if employed, will indicate, for example, the amount of capacity compensation effected by variable capacitor 352. To this effect, the scale 411 can be directly calibrated in picofarads (pf.), so as to enable pointer 420 to indicate this amount of capacity compensation. In this manner, the performance of variable capacitor 352 can be visually checked.

Another application of pointer 420 with scale 411 is based on the fact that the amount of capacity compensation effected by variable capacitor 352 is proportional to the capacity deviation introduced by the material under test in sensing capacitor 103. From this fact it follows that scale 411 may be calibrated in terms of capacity deviation at sensing capacitor 103, rather than in terms of capacity compensation by variable capacitor 352. In this manner, it is possible to read the capacity deviations caused by the material under test directly from the variable capacitor 352. A table or curve is then prepared which correlates the possible capacity deviations to the deviation in quality of the material under test. The user of the system is then capable of readily determining the quality deviations of the material under test, based on the indications rendered by pointer 420 and scale 411.

If desired, the scale 411 can also be directly calibrated in terms of quality deviations of the material under test, since the aforesaid capacity deviations are proportional to these quality deviations. Several differently calibrated and exchangeable scales could then be used, if desired, for use in testing several different materials. In this manner, the variable capacitor 352 is capable of performing, to a large extent, the function of meter 161.

If the measuring system is to be simple and inexpensive, it would even be possible to delete meter circuit 160 and the circuits immediately associated therewith and to take the readings from pointer 420 with scale 411 at the variable capacitor 352. In this case, the variable capacitor 352 could be operated in such a manner, that a current through its moving coil 409 causes full compensation of the capacity deviation to which this current is proportional.

FIGS. 12 to 14 show different ways and means for measuring and indicating the degree of wear of sensing capacitor 103 during operation of the measuring systems. In this connection, it should be understood that many materials that can be tested by exposure thereof to a sensing capacitor have highly abrasive properties. These properties cause a gradual wearing down of the sensing capacitor, if the well-known method of moving the material under test and the sensing capacitor relative to each other while maintaining the material under test in contact with the sensing capacitor is employed. This wearing down of the sensing capacitor is particularly noticeable in the continuous testing of asbestos and other materials with similar abrading properties. Since the wearing down of sensing capacitor 103 is often a factor to be taken into account during quality tests, it would be desirable to have apparatus which indicated the degree of wear of the sensing capacitor. In this manner, it could also be determined when a worn out sensing capacitor needs replacement.

FIG. 12 shows an apparatus for indicating the degree of wear of a sensing capacitor 103 and for compensating, at the same time, for an existing wear. To this end, the apparatus diagrammatically illustrated in FIG. 12 comprises a transformer 450 having a primary winding 451 connected to a source of A.C. power (not shown), and having a secondary winding 452 connected to leads 454 and 455 to impress an A.C. current therebetween. A potentiometer 457 with a movable arm 458 is connected between leads 454 and 455. Lead 455 is connected to the movable contact 460 of a double-throw switch 461 which may be of the manually actuable type. The stationary contact 463 of switch 461 is connected to the anode of a rectifier cell 465, and the stationary contact 466 of switch 468 to the cathode of a rectifier cell 468. A servo motor 470 is connected between lead 454 and a lead 472 which, in turn, is connected to the cathode of rectifier cell 465 and the anode of rectifier cell 468.

The apparatus of FIG. 12 includes a measuring instrument 474, which may be a current or voltage meter, and which is connected between lead 454 and the movable arm 458 of potentiometer 457. This movable arm 458 is mechanically coupled through a gear box 475 to the output shaft 476 of motor 470, as indicated by dotted lines. This apparatus also includes a variable capacitor 478 the capacitive parts of which are connected in parallel to sensing capacitor 103. The variable capacitor 478 may be of one of the well-known conventional types and is driven by motor 470 through gear box 475, as indicated by dotted line 480. A pair of leads 481 and 482 permit sensing capacitor 103 to be connected to the measuring systems with which it is employed.

The servo motor 470 is of a type which will rotate in one direction when energized with current of one polarity, and in the opposite direction when energized with current of opposite polarity. Servo motors of this type are well known.

The operation of the apparatus shown in FIG. 12 is as follows:

First, the user of the measuring system obtains an indication as to the deviation of the capacity of sensing capacitor 103 from its original value. As has been indicated above, this may be done by continually replacing the sensing capacitor 103 by a comparison capacitor having a capacity corresponding to the initial capacity of the sensing capacitor. This particular mode of comparison has been described above in connection with FIG. 6 and its comparison capacitor 242 and remotely controlled switch 240.

If the user notices a deviation in capacity of sensing capacitor 103 from its original value, he actuates switch 461 of the apparatus illustrated in FIG. 12. Movement of switch blade 460 into engagement with stationary contact 463 will cause the servo motor 470 to rotate in one direction and thus vary the capacity of variable capacitor 478 in one sense. On the other hand, movement of switch blade 460 into engagement with stationary contact 466 will cause the servo motor 470 to rotate in the other direction and thus vary the capacity of variable capacitor 478 in the opposite sense. This mode of operation of servo motor 470 is, of course, due to the presence of rectifier cells 465 and 468 and the use of an alternating-current source for energizing the apparatus of FIG. 12.

The user of the measuring system continues this actuation of switch 461 until the combined capacities of sensing capacitor 103 and variable capacitor 478 correspond to the initial value of sensing capacitor 103. If a standard capacitor of the type of comparison capacitor 242 of FIG. 6 is used, this latter instant is indicated by the absence of signal deviations when the sensing capacitor 103 is temporarily replaced by the standard capacitor.

The position of movable arm 458 of potentiometer 457 will correspond to the position of the movable capacitive parts of variable capacitor 478, since both the movable arm 458 and the variable capacitor 478 are driven by motor 470 through the gear box 475. Accordingly, the meter 474 can be calibrated to indicate the capacity that had to be added to sensing capacitor 103, so as to bring the capacity of this sensing capacitor back to its initial value. If desired, the meter 474 can be calibrated in terms of wear of sensing capacitor 103, since the amount of capacity the variable capacitor 478 has to add will correspond to the degree of wear of sensing capacitor 103. Thus, the meter 474 may, for instance, be calibrated in "percent of wear of the sensing capacitor." In this manner, it is possible to ascertain the degree of wear of sensing capacitor 103 and the ultimate need of replacement thereof quickly and conveniently.

It will be noted that the apparatus shown in FIG. 12 bears a strong resemblance to the circuit of FIG. 6 which includes the transformer 250, the rectifier cells 254 and 255, the switch 259, and the motor-driven variable capacitor 257. Accordingly, the features of the apparatus shown in FIG. 12 may be realized by incorporating the motor-driven potentiometer 457 with meter 474 into the system of FIG. 6. The potentiometer 457 of FIG. 12 would then be connected across the secondary winding 252 of the transformer 250 of FIG. 6, and the meter 474 between the movable arm 458 of potentiometer 457 and the ground lead 75, for instance. This arrangement would have the advantage that wear in sensing capacitor 103 could not only be remotely compensated, but also remotely ascertained as to its relative or absolute value.

It should, of course, be understood that the apparatus of FIG. 12 may be used with measuring systems other than that shown in FIG. 6. Thus, there are a large number of known dielectric measurement systems in which the apparatus of FIG. 12 may find application.

FIG. 13 shows other ways and means for ascertaining and indicating the degree of wear of a sensing capacitor. In this figure, the sensing capacitor is generally designated by the reference numeral 500, since its structure is somewhat different from that of the previously mentioned sensing capacitor 103. Nevertheless, it should be understood that the sensing capacitor 500 shown in FIG. 13 may take the place of conventional sensing capacitors in the measuring systems described so far or, for that matter, in various conventional dielectric-type measuring systems or apparatus.

The sensing capacitor 500 shown in FIG. 13 comprises, as its primary elements, a first capacitor plate 501, a second capacitor plate 502, and a layer 504 of a preferably wear-resistant dielectric material, such as quartz, located between capacitor plates 501 and 502. These parts 501, 502 and 504 form the sensing assembly of capacitor 500. In the shown embodiment, the capacitor plate 502 is interposed between a pair of thin layers 505 and 506 of dielectric material, such as mica leaves. The layers 505 and 506, in turn, are interposed between a pair of thin layers 507 and 508 of electroconductive material, such as metal. In this manner, the conductive layers 507 and 508 are insulated from capacitive plate 502 and also from capacitive plate 501. The conductive layer 507 forms an equipotential stratum between capacitor plates 501 and 502, so that its presence does not undesirably influence the sensing operation of capacitor 500.

In practice, the elements of capacitor 500 so far described are closely packed together, and are not mutually spaced. The slight mutual spacing between these elements as illustrated has been shown in FIG. 13 only for the purpose of improved illustration.

The conductive layers 507 and 508 are thin enough to have an appreciable electrical resistance. To this effect, they may also be made of one of the conventional electric resistance materials. To permit measurement or evaluation of this resistance, the layer 507 has a pair of terminal legs or tabs 510 and 511, and the layer 508 a pair of terminal legs or tabs 512 and 513. A resistor 515 is connected between tabs 510 and 512, and a resistor 516 between tabs 511 and 513. A source of electric current 518, here indicated as a battery, is connected between tabs 511 and 512, and a current meter 520 between tabs 510 and 513. In this manner, a four-corner resistance measuring bridge is formed, with the layers 507 and 508 forming the first pair of opposite arms, and the resistors 515 and 516 the second pair of opposite arms of this four-corner bridge. Current source 518 is located in one diagonal branch of this bridge, and meter 520 in the other diagonal branch of the bridge. In connection with the subject embodiment, it is assumed that the material under test, such as a moving sheet of asbestos or the like, contacts the capacitor 500 assembly its surface 522. As operation time goes by, the capacitor assembly will be abraded or worn off, so that the top surface 522 will gradually approach the corresponding bottom surface of the assembly. This abrasion will, of course, also effect a gradual decrease in height of the conductive layers 507, 508. This decrease in height will lead to a corresponding decrease in resistivity of conductive layers 507 and 508, provided these layers are sufficiently thin and resistive to render changes in their height reasonably noticeable. Since the conductive layers 507 and 508 are, as mentioned above, located in opposite arms of the aforesaid bridge, their simultaneous decrease in resistivity will combine to produce a significant change in current in the meter 520. For the purpose of convenience, this meter is preferably calibrated in terms of relative wear of sensing capacitor 500. In this manner, it is possible to obtain a convenient indication of the condition of wear of the sensing capacitor. This indication helps the user of the measuring system to determine when steps are necessary to correct the effects of gradual wear, such as by adding capacity to sensing capacitor 500 to compensate for wear or by replacing a significantly worn out sensing capacitor prior to commencement of further measuring operations.

It will, of course, be appreciated that the conductive layers 507 and 508 could be disposed in locations different from that illustrated in FIG. 13, provided these layers are still exposed to wear by the material under test and are not located so as to pick up undesirable high-frequency signals from capacitor plates 501 and 502. High-frequency signals of reasonable magntiude could be minimized by connecting choke coils in the aforesaid bridge circuit, such as in the illustrated connections leading from tabs 510, 511, 512, and 513, respectively.

It will also be understood that the bridge-type system just described could be incorporated onto the multi-plate capacitor arrangements known in the art.

In principle, it would also be possible to use only one of the conductive layers 507 and 508 and to determine its changes in resistivity. However, the use of two layers 507 and 508 in the manner shown and described, is believed to lead to improved measuring accuracy and sensitivity.

FIG. 14 shows an arrangement for measuring sensing capacitor wear by utilizing capacitive principles. The arrangement 525 shown in FIG. 14 bears a strong resemblance to that of FIG. 13, in that it also comprises the above-mentioned capacitor plates 501 and 502, the primary layer 504 of dielectric material, the thin layers 505 and 506 of dielectric material, and the electroconductive layers 507 and 508. However, in the instant case, it is the resulting capacity between layers 507 and 508, rather than their change in resistivity, that is taken as the basis for measurement. To this effect, the layers 507 and 508 have connected therebetween, in three mutually parallel branches, a high-frequency generator 530 with series capacitor 531, a rectifier 532, and a measuring instrument 533 with series resistor 534. Each of these parts 530 to 534 may be of a conventional type. During operation, the output signal of high-frequency generator 530 charges, during alternate half cycles thereof, the capacitor 531. During the opposite half cycles, the rectifier 532 will not conduct, and the signal from generator 531 will charge the capacitor arrangement composed of conductive layers 507 and 508, dielectirc layers 505 and 506, and capacitor plate 502. In the periods between subsequent ones of these opposite half cycles, that is during the first-mentioned alternate half cycles, the capacitor arrangement last mentioned will discharge through instrument 533 with series resistor 534 and will thus lead to an indication of instrument 533 in accordance with the capacitance of the capacitor arrangement including conductive plates 507 and 508. The latter capacitance will decrease with progressive wear of sensing capacitor 525, including wear of layers 507 and 508, so that the indications supplied by instrument 533 are a measure of the degree of wear. One important point to consider is that the stray fields at the surface 522 of the capacitive elements of sensing capacitor 525 will not be altered as the sensing capacitor wears down. To illustrate this point, the upper stray field of the capacitive element composed of conductive layer 507, dielectric layer 505 and capacitor plate 502 has been schematically indicated in FIG. 14 by the array of dotted lines and circles 540. Upon consideration of FIG. 14 it will become clear that this stray field 540 is not affected by the height of sensing capacitor 525. Therefore, the data supplied by measuring instrument 533 will be proportional to the remaining height of sensing capacitor 525 after a certain wear, since the stray field 540 and the similar stray fields of the other elements of sensing capacitor 525 will remain practically unchanged.

If desired, the two auxiliary capacitors constituted by layer 507, foil 505 and plate 502, and by layer 508, foil 506 and plate 502 may be connected in parallel. This may be accomplished by connecting one of the leads from generator 530 and capacitor 531 to plate 502 and the other one of these leads jointly to layers 507 and 508. Such a parallel connection of the two auxiliary capacitors will render the signal variation at meter 533 more linear in case the wear at surface 522 should be unequal at the locations of the auxiliary capacitors.

It will now be understood that the instrument 533 may be directly calibrated in "percent of wear of the sensing capacitor."

As to utility and modifications of the capacitor arrangement of FIG. 14, practically the same considerations apply as the one recited above in connection with FIG. 13, except that no high-frequency chokes need be employed in the connections between generator 530 and layers 507 and 508.

The meter 520 shown in FIG. 13 or the meter 533 shown in FIG. 14 may be replaced by a servo loop system (not shown) which is effective to add capacity to the sensing capacitor as the wear progresses. To this end, a servo system of the type shown in FIG. 12 with motor 470 and variable capacitor 478 may be employed. The error signals across meter 520 or 533 may be amplified before being fed to the servo motor. Non-linearity in these error signals may also be compensated for at this point.

FIG. 15 shows a longitudinal section of a device 600 by means of which the meter-current reversal switch 168 shown in FIGS. 3, 6, 7 and 10 and the vernier or fine-adjustment potentiometer 195 also shown in these figures, may be actuated by a single knob 601. Switching device 600 comprises a front or mounting plate 602 having an opening 604. An elongated housing 605 having a side wall 606 and a bottom 607 is attached to front plate 602 adjacent the opening 604. A tubular member 608 is rotatably and slidably mounted in housing 605 by means of an apertured mounting member 610 attached to housing 605. Tubular member 608 has an enlarged end portion 611 which extends through the opening 604 of front plate 602 and thus aids the member 610 in rotatably and slidably mounting tubular member 608. The potentiometer 195 is mounted to the bottom 607 of housing 605 and has a shaft 612 extending into the housing 605. Shaft 612 has one plate 614 of a friction clutch 615 attached thereto. The other plate 616 of clutch 615 is attached to the tubular member 608. Member 608 has attached thereto an annular element 618 which serves as an abutment for a helical spring 619 disposed between mounting member 610 and element 615. The spring 619 biases the tubular member 608 to the right as seen in FIG. 15, and biases the clutch plate 616 into engagement with mounting member 610, so that clutch plates 614 and 616 are normally disengaged from each other.

The tubular member 608 has attached thereto a washer 621 which, in cooperation with enlarged end portion 611 rotatably retains an actuator element 622 having an actuator finger 624. Actuator finger 624 extends through a keyway 625 in the side wall 606 of housing 605. The above-mentioned switch 168 is mounted on housing side wall 606 and has a spring-biased plunger 628 located adjacent actuator finger 624. The distance between clutch plates 614 and 616 is made larger than the distance the plunger 628 has to travel in order to actuate switch 168 from one position to the other.

The knob 601 is attached to one end of a shaft 630 which is slidably and rotatably mounted by a pair of bearing elements 631 and 632 attached to tubular member 608 and located at the inside thereof. A key 635 is attached to the other end of shaft 630 and slides in a key way 636 provided in tubular member 608. A helical spring 638, partially located in extended end portion 611 of tubular member 608, biases the knob 601 and shaft 630 to the right as seen in FIG. 15. In this manner, the key 635 at shaft 630 is normally maintained in engagement with tubular member 608 at the right extremity, as seen in FIG. 15, of the keyway 636.

The function of the device shown in FIG. 15 is as follows:

If the knob 601 is turned without being depressed, neither switch 168 nor potentiometer 195 is actuated. Therefore, an accidental turning of knob 601 will have no adverse effects. If the knob 601 is depressed, the spring 638 will transmit the force of depression to tubular member 608. Member 608 will thus be moved to the left, as seen in FIG. 15. Since the distance between clutch plates 614 and 616 is made larger than the distance the plunger 628 has to travel to actuate switch 168 from one position to the other, as has been mentioned above, the switch 168 will be actuated before the clutch plates 614 and 616 engage. Therefore, switch 168 may be actuated without actuation of potentiometer 195. An accidental rotation of knob 610 during the depression thereof for the purpose of actuation of switch 168 only, will thus have no adverse effects.

As has been mentioned above, particularly in connection with FIG. 3, actuation of switch 168 will effect an actuation of contacts 163 and 164 adjacent meter 161, and thus a reversal of current in meter 161. Reversal of this current will permit meter 161 to indicate the bias current supplied by the bias circuit 190 which has been shown in FIG. 3 and also in FIGS. 6, 7 and 10. This is so because meter bias current is in opposition to the signal supplied by discriminator 110, as has been mentioned above, and is thus "negative" with respect to the discriminator signal normally being measured.

If an adjustment of the bias current supplied by circuit 190 is desired, the knob 601 is depressed further until the clutch plate 616 engages the clutch plate 614. This further depression has no adverse effect on switch 168, since the actuator finger 642 possesses a certain resiliency. With the clutch plates 614 and 616 being in mutual engagement, the depressed knob 601 may now be turned to effect adjustment of the potentiometer 195. As has been mentioned above, adjustment of this potentiometer will vary the bias current supplied by circuit 190 shown in FIGS. 3, 6, 7 and 10. In this manner, the effect of the potentiometer adjustment can be readily observed on the meter 161.

If the knob 601 is released, the bias spring 619 will move the tubular member 608 back to the right, as seen in FIG. 15, and will thus disengage clutch 615 and permit switch 168 to assume its initial position.

During the whole of the operation just described, the bias spring 638 and the lost motion between key 635 and keyway 638 will impart a certain flexibility between knob 601 and tubular member 607. The spring 638 is preferably dimensioned such that the key 635 is prevented from striking the left-hand extremity, as seen in FIG. 15, of key way 636. In this manner, damage to clutch 615 and potentiometer 195 by abrupt handling of knob 601 is largely avoided. In other words, actuation of clutch 615 will be soft rather than abrupt, irrespective of the handling of knob 601.

From the subject description of the invention and all the illustrated embodiments thereof, it will be apparent that the invention encompasses and covers a large variety of concepts that are capable of cooperation to provide advanced and superior measuring systems. Many of these concepts would alone be sufficient to impart superior properties to the types of measuring systems described herein. Therefore, the concepts, features, apparatus and circuits herein described could be used singly or in any suitable combination, as will be apparent to those skilled in the art.

In addition, many modifications within the scope of the invention are readily possible, so that the invention is not to be deemed limited to any of the shown or described embodiments thereof.

I claim:

1. A measuring system for testing non-electroconductive materials, comprising:
    (a) an oscillator for producing an electric oscillation the frequency of which varies in response to capacity variations;
    (b) a discriminator for producing a direct-current signal the amplitude of which is a function of the frequency of said electric oscillation;
    (c) a sensing capacitor for sensing a predetermined parameter of a non-electroconductive material under test, the sensing capacitor having a predetermined inherent capacity;
    (d) a comparison capacitor having a capacity of a value substantially similar to that of the inherent capacity of the sensing capacitor;
    (e) means for exposing the sensing capacitor to the material under test for causing the sensing capacitor to experience a capacity variation in accordance with said parameter of the material under test;
    (f) first switching means for alternately connecting the sensing capacitor and the comparison capacitor to the oscillator for causing the discriminator to produce alternately a first direct-current signal the amplitude of which corresponds to the actual capacity of the sensing capacitor and a second direct-current signal the amplitude of which corresponds to the capacitor value of the comparison capacitor;
    (g) a pair of storage capacitors;
    (h) second switching means operating in substantial synchronism with the first switching means for charging one of said storage capacitors with said first direct-current signal, and for charging the other of said storage capacitors with said second direct-current signal;
    (i) means for interconecting said pair of charged storage capacitors to produce a combined signal corresponding to the difference between said first and second signals; and
    (j) measuring means responsive to said combined signal for indicating the parameter sensed by said sensing capacitor.

2. In a measuring system:
    (a) a sensing capacitor;
    (b) a variable capacitor connected to the sensing capacitor;
    (c) a pair of terminals for the interconnected sensing capacitor and variable capacitor;
    (d) a servo motor for adjusting the variable capacitor, the servo motor having a pair of input terminals for receiving an energizing current and being of a type having a sense of rotation dependent on the polarity of the energizing current applied to the input terminals;
    (e) a first rectifier device having an anode connected to one of the input terminals of the motor, and having a cathode;
    (f) a second rectifier device having a cathode connected to said one of the input terminals of the motor, and having an anode;
    (g) a source of alternating-current having a first terminal connected to the other of the input terminals of the motor, and having a second terminal; and
    (h) a double-throw switch having a first stationary contact connected to the cathode of the first rectifier device and a second stationary contact connected to the anode of the second rectifier device, the switch including a movable contact selectively actuable between said first and second stationary contacts and connected to said second terminal of the alternating-current source.

3. A measuring system for testing materials; comprising:
    (a) a sensing capacitor;
    (b) a variable capacitor connected to the sensing capacitor;
    (c) a pair of terminals for the interconnected sensing capacitor and variable capacitor;
    (d) a servo motor for adjusting the variable capacitor, the servo motor having a pair of input terminals for receiving an energizing current and being of a type having a sense of rotation dependent on the polarity of the energizing current applied to the input;
    (e) a first rectifier device having an anode connected to one of the input terminals of the motor, and having a cathode;
    (f) a second rectifier device having a cathode connected to said one of the input terminals of the motor, and having an anode;
    (g) a source of alternating-current having a first terminal connected to the other of the input terminals of the motor, and having a second terminal;
    (h) a double-throw switch having a first stationary contact connected to the cathode of the first rectifier device and a second stationary contact connected to the anode of the second rectifier device, the switch including a movable contact selectively actuable between said first and second stationary contacts and connected to said second terminal of the alternating-current source;
    (i) means for producing a signal corresponding to the capacitance at said pair of terminals for the interconnected sensing capacitor and variable capacitor, said means including a phase-shift discriminator having a substantially S-shaped discriminator characteristic; and
    (j) means for measuring said signal.

4. In a measuring system:
    (a) a sensing capacitor having an inherent capacity that is subject to deviations from a desired inherent capacity;
    (b) a variable capacitor connected to the sensing capacitor;
    (c) a servo motor for adjusting the variable capacitor, the servo motor having a pair of input terminals for receiving an energizing current and being of a type having a sense of rotation dependent on the polarity of the energizing current applied to the input terminals;
    (d) a first rectifier device having an anode connected to one of the input terminals of the motor, and having a cathode;
    (e) a second rectifier device having a cathode connected to said one of the input terminals of the motor, and having an anode;
    (f) an alternating-current source having a first terminal connected to the other input terminal of the motor, and having a second terminal;
    (g) a double-throw switch having a first stationary terminal connected to the cathode of the first rectifier device, and a second stationary terminal connected to the anode of the second rectifier device, and including a movable contact connected to the second terminal of the current source and selectively actuable between said first and second stationary contact to cause movement of the motor in one and the other sense of rotation for adjustment of the variable capacitor to compensate for said deviations in the sensing capacitor;

(h) a potentiometer having a movable arm and being connected between said first and second terminals of the current source;

(i) means for moving said potentiometer arm in synchronism with the adjustments of the variable capacitor; and (j) means for indicating the instant position of the movable potentiometer arm.

5. A sensing capacitor for exposure to moving material under test, comprising:

(a) a capacitor structure including capacitor plate members separated by dielectric material, the capacitor structure having a surface which is contacted by the moving material under test, whereby the capacitor structure is subjected to gradual wear;

(b) a pair of spaced foils of electroconductive material extending substantially perpendicularly to said surface of the capacitor structure and being electrically insulated from each other and from the capacitor plate member; and (c) means including a resistor bridge circuit for measuring the electrical resistance of the foils to determine the degree of wear of the capacitor structure.

6. A sensing capacitor for exposure to moving material under test, comprising:

(a) a capacitor structure including capacitor plate members separated by dielectric material, the capacitor structure having a surface which is contacted by the moving material under test, whereby the capacitor structure is subjected to gradual wear;

(b) a pair of spaced foils of electroconductive material extending substantially perpendicular to said surface of the capacitor structure and being electrically insulated from each other and from the capacitor plate members, each of said foils having a pair of spaced terminals;

(c) a first resistor connected between one terminal of one foil and one terminal of the other foil;

(d) a second resistor connected between the other terminal of said one foil and the other terminal of said other foil;

(e) means for impressing an electrical potential between said one terminal of said one foil and said other terminal of said other foil; and (f) means for measuring the electrical potential between said one terminal of said other foil and said other terminal of said one foil for determining the degree of wear of the capacitor structure.

7. A measuring system for testing moving materials, comprising:

(a) a sensing capacitor for sensing a predetermined parameter of the moving material, the sensing capacitor including capacitor plate members separated by dielectric material, and the sensing capacitor having a surface which is contacted by the moving material, whereby the sensing capacitor is subjected to gradual wear;

(b) a pair of spaced foils of electroconductive material extending substantially perpendicularly to said surface of the sensing capacitor and being electrically insulated from each other and from the capacitor plate members;

(c) means including a resistor bridge circuit for measuring the electrical resistance of the foils to determine the degree of wear of the sensing capacitor;

(d) means including a discriminator having a substantially S-shaped discriminator characteristic for producing an electric signal corresponding to the parameter sensed by the sensing capacitor; and (e) means for measuring said electric signal.

8. A sensing capacitor for exposure to moving material under test, comprising:

(a) a first sensing capacitor plate;

(b) two foils of dielectric material having the first sensing capacitor plate interposed therebetween;

(c) two foils of electroconductive material having the two foils of dielectric material and the first sensing capacitor plate interposed therebetween;

(d) a second sensing capacitor plate;

(e) a layer of dielectric material interposed between the second capacitor plate and one of the foils of electroconductive material, the layer of dielectric material, the first and second sensing capacitor plates, the two foils of dielectric material, and the two foils of electroconductive material each having a surface that is subjected to the moving material under test, whereby the sensing capacitor is subjected to gradual wear; and (f) means for measuring the actual capacity between the two foils of electroconductive material for determining the degree of wear of the sensing capacitor.

9. A sensing capacitor for exposure to moving material under test, comprising:

(a) a first sensing capacitor plate;

(b) two foils of dielectric material having the first sensing capacitor plate interposed therebetween;

(c) two foils of electroconductive material having the two foils of dielectric material and the first sensing capacitor plate interposed therebetween;

(d) a second sensing capacitor plate;

(e) a layer dielectric material interposed between the second capacitor plate and one of the foils of electroconductive material, the layer of dielectric material, the first and second sensing capacitor plates; the two foils of dielectric material, and the two foils of electroconductive material each having a surface that is contacted by the moving material under test, whereby the sensing capacitor is subjected to gradual wear;

(f) a high-frequency generator;

(g) a capacitor connected in series to the high-frequency generator;

(h) means for connecting the series connected high-frequency generator and capacitor to the two foils of electroconductive material;

(i) a rectifier device connected between the two foils of electroconductive material; and (j) an electric measuring circuit connected between the two foils of electroconductive material for determining the degree of wear of the sensing capacitor.

References Cited by the Examiner

UNITED STATES PATENTS

| | | | |
|---|---|---|---|
| 2,508,081 | 5/1950 | Taylor et al. | 324—61 |
| 2,531,186 | 11/1950 | Yardeny et al. | 338—198 X |
| 2,611,021 | 9/1952 | Perls et al. | 324—57 X |
| 2,865,000 | 12/1958 | Newell | 324—123 |
| 2,904,751 | 9/1959 | Parsons | 324—61 |
| 2,920,272 | 1/1960 | Erdman et al. | 324—61 |
| 3,015,950 | 1/1962 | Doctor et al. | 324—61 X |
| 3,046,479 | 7/1962 | Mead et al. | 324—61 |
| 3,058,056 | 10/1962 | Huber | 324—57 X |
| 3,215,931 | 11/1965 | Schooley | 324—61 |

FOREIGN PATENTS 349,102   11/1960   Sweden.

WALTER L. CARLSON, *Primary Examiner.*

E. E. KUBASIEWICZ, *Assistant Examiner.*